US006978872B2

(12) United States Patent
Turner

(10) Patent No.: US 6,978,872 B2
(45) Date of Patent: Dec. 27, 2005

(54) HYDRAULIC DAMPERS WITH PRESSURE REGULATED CONTROL VALVE

(75) Inventor: Roy A. Turner, Victorville, CA (US)

(73) Assignee: Progressive Suspension Inc., Hesperia, CA (US)

( * ) Notice: Subject to any disclaimer, the term of this patent is extended or adjusted under 35 U.S.C. 154(b) by 0 days.

(21) Appl. No.: 10/449,722

(22) Filed: May 29, 2003

(65) Prior Publication Data

US 2004/0020730 A1 Feb. 5, 2004

Related U.S. Application Data

(60) Provisional application No. 60/384,369, filed on May 29, 2002.

(51) Int. Cl.[7] .............................. F16F 9/56; F16F 9/00

(52) U.S. Cl. .............................. 188/282.8; 188/282.1; 188/314; 188/317; 188/318

(58) Field of Search ............................ 188/281, 282.1, 188/282.5, 282.6, 284, 297, 298, 313, 317, 188/322.15, 322.13, 269, 282.7, 282.8, 314, 188/318

(56) References Cited

U.S. PATENT DOCUMENTS

| | | | | |
|---|---|---|---|---|
| 1,164,371 A | * | 12/1915 | Lovejoy | 188/317 |
| 2,244,501 A | | 6/1941 | Pierce | |
| 2,357,278 A | | 8/1944 | O'Connor | |
| 3,865,356 A | * | 2/1975 | Wossner | 188/317 |
| 3,990,687 A | | 11/1976 | Curnutt | |
| 4,210,344 A | | 7/1980 | Curnutt | |
| 4,245,854 A | | 1/1981 | Curnutt | |
| 4,271,938 A | | 6/1981 | Berger | |
| 4,407,396 A | * | 10/1983 | Sirven | 188/282.8 |
| 4,645,043 A | | 2/1987 | Imaizumi | |
| 4,645,044 A | | 2/1987 | Kato et al. | |
| 4,683,992 A | | 8/1987 | Watanabe | |
| 4,749,068 A | * | 6/1988 | Sirven | 188/322.15 |
| 4,972,928 A | * | 11/1990 | Sirven | 188/322.14 |
| 5,064,032 A | | 11/1991 | Ashiba | |
| 5,190,126 A | | 3/1993 | Curnutt | |
| 5,207,300 A | | 5/1993 | Engel et al. | |
| 5,226,512 A | | 7/1993 | Kanari | |
| 5,400,880 A | | 3/1995 | Ryan | |
| 5,505,281 A | * | 4/1996 | Lee | 188/322.15 |
| 5,533,586 A | | 7/1996 | Thompson | |
| 5,533,596 A | * | 7/1996 | Patzenhauer et al. | 188/318 |
| 5,664,649 A | | 9/1997 | Thompson et al. | |
| 5,927,449 A | * | 7/1999 | Huang et al. | 188/322.15 |

(Continued)

FOREIGN PATENT DOCUMENTS

FR 2312925 12/1976

(Continued)

*Primary Examiner*—Thomas Williams
(74) *Attorney, Agent, or Firm*—Workman Nydegger

(57) ABSTRACT

A suspension damper includes a housing bounding a main chamber. A piston rod is slideably disposed within the main chamber of the housing. A main piston is mounted on the first end of the piston rod within the main chamber of the housing so as to slideably engage against the housing in sealed engagement, the main piston having a first side and an opposing second side with a compression port extending therebetween. A control valve assembly is disposed within the main chamber and bounds a sealed valve compartment. The control valve assembly is movable between a first position wherein the valve compartment is compressed to a first volume and a second position wherein the valve compartment is expanded to an enlarged second volume, the control valve assembly being movable under pressure so as to provide variable compression damping properties.

71 Claims, 29 Drawing Sheets

U.S. PATENT DOCUMENTS

| | | | |
|---|---|---|---|
| 5,957,252 | A | 9/1999 | Berthold |
| 6,086,060 | A | 7/2000 | Berthold |
| 6,220,409 | B1 | 4/2001 | Deferme |
| 6,254,067 | B1 | 7/2001 | Yih |
| 6,264,015 | B1 | 7/2001 | De Kock |
| 6,286,642 | B1 | 9/2001 | Yi |
| 6,305,512 | B1 | 10/2001 | Heinz et al. |
| 6,340,153 | B1 | 1/2002 | Miesner |
| 6,390,457 | B1 | 5/2002 | Roper |
| 6,450,304 | B1 | 9/2002 | Miller et al. |

FOREIGN PATENT DOCUMENTS

| | | |
|---|---|---|
| GB | 2 071 807 A | 9/1981 |

* cited by examiner

HYDRAULIC DAMPERS WITH PRESSURE REGULATED CONTROL VALVE

CROSS-REFERENCE TO RELATED APPLICATIONS

The present application claims priority to U.S. Patent Provisional Application Ser. No. 60/384,369, filed on May 29, 2002, which is incorporated herein by specific reference.

BACKGROUND OF THE INVENTION

1. The Field of the Invention

The present invention relates to hydraulic dampers which can be used independently or as part of a shock absorber, front fork or other suspension system.

2. The Relevant Technology

Dampers are used in conventional shock absorbers, front forks, and other suspension systems to dampen or absorb an impact or force applied to the suspension system. For example, a conventional damper includes a tubular housing bounding a sealed chamber. An incompressible hydraulic fluid is disposed within the chamber of the housing. One end of a piston rod having a piston mounted thereon is also disposed within the chamber. Orifices extend through the piston so that the piston can slide within the chamber of the housing as the hydraulic fluid passes through the orifices.

When a compressive force is applied to the damper, such as when an automobile having shock absorbers hits a bump, the force seeks to drive the piston rod into the chamber of the housing. The damper partially absorbs this force by using the force to compress the hydraulic fluid through orifices. When a rebound force is applied to the damper, such as through the application of a spring, the damper again regulates the rebound force by requiring the hydraulic fluid to pass back through the orifices in the piston in order for the piston rod to return to its original position.

Although conventional dampers impart some degree of damping to suspension systems, conventional dampers have significant shortcomings. For example, the damping properties of conventional dampers are directly related to the constant restriction of the hydraulic fluid flow through the orifices extending through the piston. As this variable does not change along the stroke of the piston rod, the damping properties are substantially constant independent of the force applied or the position of the piston rod. As a result, minimum damping performance is achieved. That is, what is needed in the art are dampers for suspension systems that can automatically adjust the damping characteristics throughout the range of piston movement to more efficiently dampen based on changing operating and road conditions.

Although attempts have been made to produce adjustable dampers, such dampers have had minimal effectiveness, are difficult and expensive to produce, and permit minimal selective adjustment based on use and condition requirements.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

The present invention relates to hydraulic dampers which can be used independently or as part of a shock absorber, front fork or other suspension system. Such dampers can be used in association with all types of vehicles or mechanical apparatus where it is desired to control suspension movement and/or vibration. Examples of vehicles on which the dampers can be used include bicycles, motorcycles, automobiles, all terrain vehicles, snowmobiles, airplanes, and the like.

Figure 1:
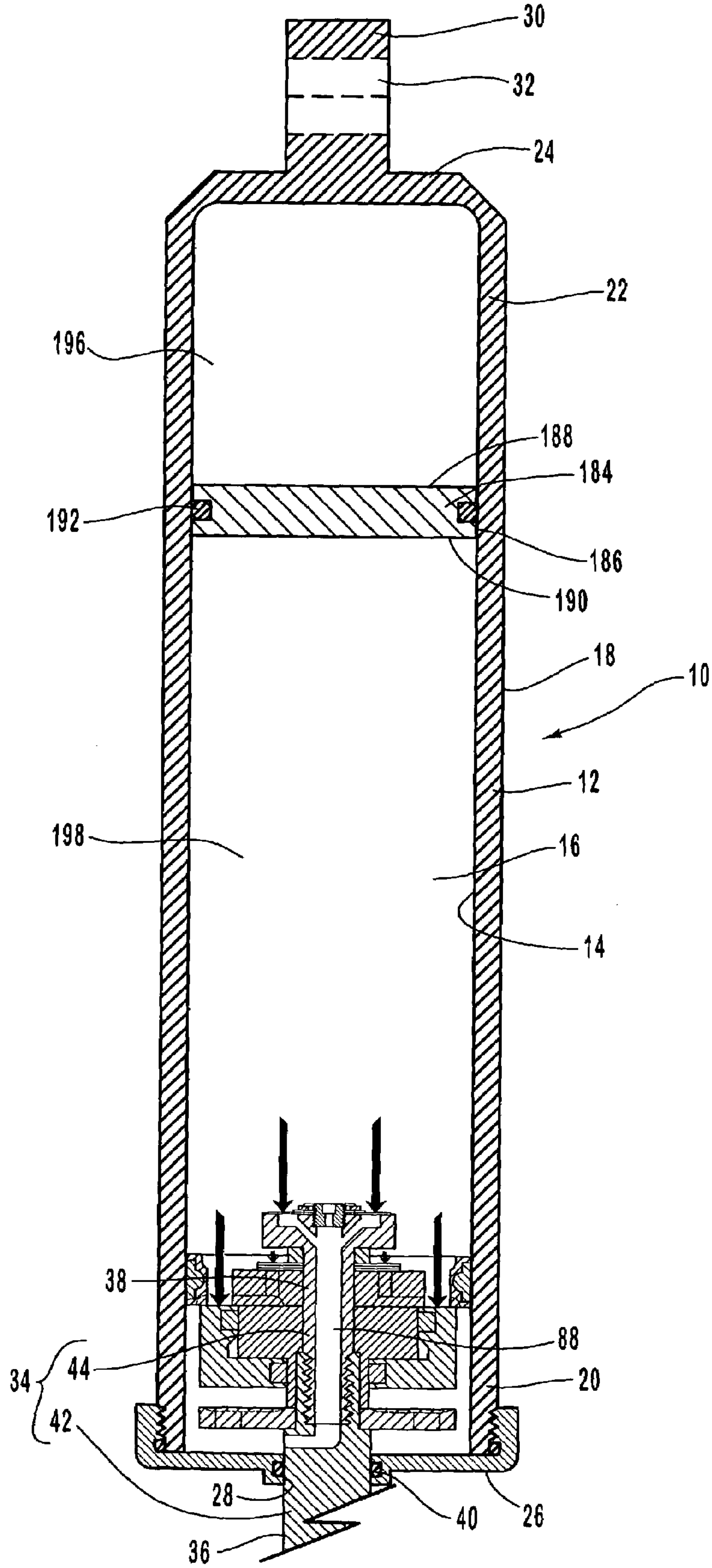
FIG. 1 is a cross sectional side view of one embodiment of a damper.

Depicted in FIG. 1 is one embodiment of a damper 10 incorporating features of the present invention. Damper 10 comprises a housing 12 having an interior surface 14 bounding a chamber 16. Housing 12 comprises a cylindrical sidewall 18 that extends between a proximal end 20 and an opposing distal end 22. An end wall 24 is formed at distal end 22 of sidewall 18. A bracket 30 having a hole 32 extending therethrough is formed on end wall 24 for selectively attaching damper 10 to a structure. In alternative embodiments, bracket 30 can be replaced with any conventional attachment structure.

A cap 26 is removably threaded or otherwise attached onto proximal end 20 of sidewall 18. Cap 26 has a passageway 28 centrally extending therethrough so as to communicate with chamber 16. A piston rod 34 is slideably disposed within passageway 28 so as to extend into and outside of chamber 16. Piston rod 34 has an exterior surface 36 extending between a proximal end 37 (FIG. 2) and an opposing distal end 38. An annular seal 40 extends between cap 26 and piston rod 34 so as to effect a sealed connection that enables piston rod 34 to freely slide relative to housing 12.

Figure 2:
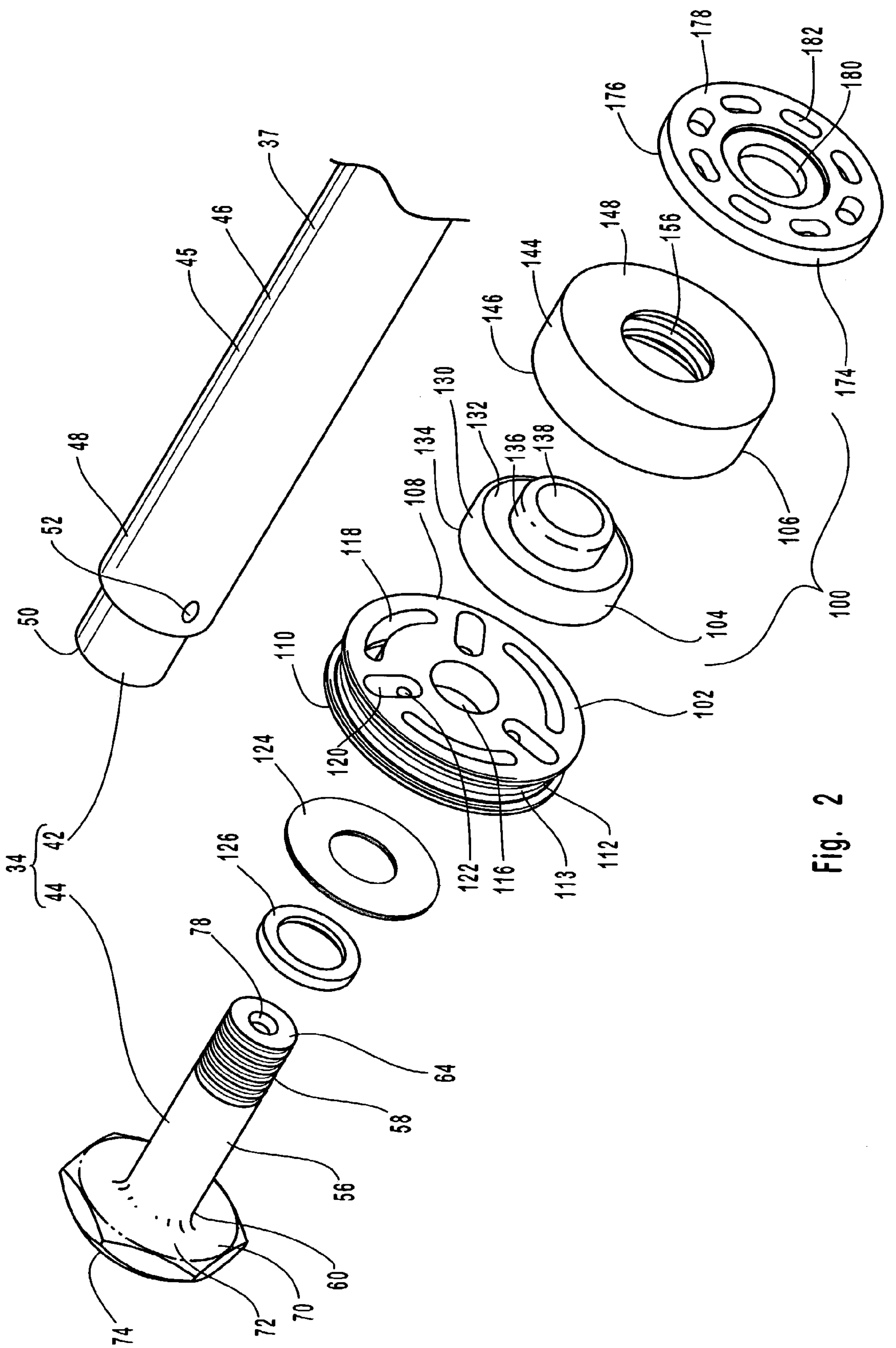
FIG. 2 is an exploded perspective view the distal end of the piston rod of the damper depicted in FIG. 1.

Piston rod 34 comprises a base rod 42 and a bolt 44. As depicted in FIG. 2, base rod 42 comprises an exterior surface 45 extending between a proximal end 46 and an opposing distal end 48. Distal end 48 terminates at a distal end face 50. A substantially L-shaped channel 52 (see also FIG. 3) extends from distal end face 50 to exterior surface 45 at distal end 48.

Figure 3:
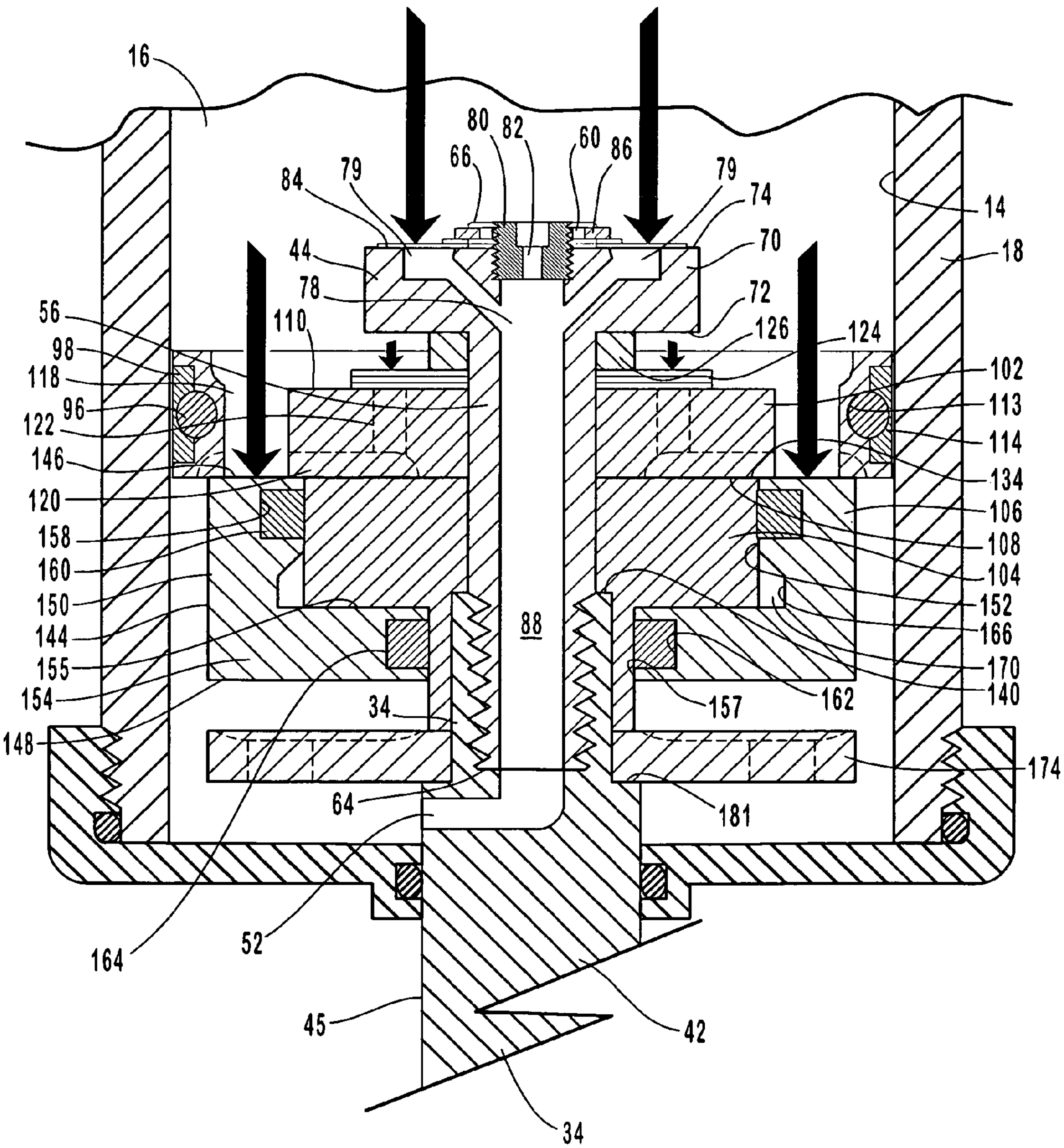
FIG. 3 is an enlarged cross sectional side view of the components shown in FIG. 2 in an assembled state.

Bolt 44 comprises a shaft 56 having a proximal end 58 and an opposing distal end 60. Proximal end 58 of shaft 56 terminates at a proximal end face 64. As depicted in FIGS. 2 and 3, distal end 60 of shaft 56 terminates at a distal end face 66. Encircling and radially outwardly projecting from shaft 56 at distal end 60 is a head 70. Head 70 also has a proximal end face 72 and an opposing distal end face 74. Distal end face 74 of head 70 is spaced proximal of distal end face 66 of shaft 56. A channel 78 extends through shaft 56 from distal end face 66 to proximal end face 64. A plurality of radially spaced apart ports 79 extend from channel 78 to distal end face 74 of head 70. Removably threaded into channel 78 at distal end face 66 of shaft 56 is a jet 80 having an opening 82 extending therethrough. For reasons as will be discussed below in greater detail, jet 80 can be replaced with other jets having different sized openings. Alternatively, jet 80 can be replaced with a plug so that the only access to channel 78 at distal end 60 of shaft 56 is through ports 79.

One or more flexible metal spring shims 84 are mounted on distal end face 74 of head 70 so as to encircle shaft 56 and cover the openings to ports 79. Shims 84 are secured in place by a C-clip 86 mating with a groove on shaft 56 distal of shims 84. In an alternative embodiment, C-clip 86 can be replaced with a washer. Jet 80 can then be formed with an outwardly projecting flange at the end thereof. As jet 80 is screwed into channel 78, the flange biases the washer against the shims 84 so as to secure shims 84 in place.

During assembly, proximal end 58 of bolt 44 is threaded into distal end 48 of base rod 42 so that channels 52 and 78 are in fluid communication. The combination of channels 52 and 78 are herein referred to as rebound channel 88. In alternative embodiments, it is appreciated that base rod 42 and bolt 44 can be integrally formed as a single member. Furthermore, bolt 44 can be replaced with a nut that threads onto the distal end of base rod 42.

Depicted in FIG. 2, mounted on distal end 38 of piston rod 34 is a main piston 102, a control valve assembly 100, and a stop plate 174. Control valve assembly 100 comprises a valve guide 104 and a control valve 106. Main piston 102 has a substantially circular disk shape configuration with a proximal face 108, an opposing distal face 110, and a peripheral side 112 extending therebetween. A groove 113 is formed on peripheral side 110 so as to receive an annular seal 114 (FIG. 3). In the embodiment depicted, seal 114 comprises a flexible o-ring 96 that outwardly biases an annular band 98. Band 98 is typically comprised of Teflon. Other conventional seal configurations can also be used. It is noted that in several of the other drawings showing pistons, the annular seal has been not been shown in the peripheral groove. This was done so as to help clarify the drawings. It is appreciated that in use, however, a seal is disposed within each peripheral groove.

A plurality of spaced apart, elongated pressure ports 118 extend through main piston 102 from proximal face 108 to distal face 110. Pressure ports 118 extend at a substantially constant radius from the center of main piston 102. Disposed on proximal face 108 between each adjacent pressure port 118 is an elongated shallow pocket 120. Each pocket extends along a radial axis aligned with the center of main piston 102. Extending from distal face 110 of main piston 102 to each pocket 120 is a corresponding rebound port 122. Rebound ports 122 are disposed radially inward of pressure ports 118. A central opening 116 also extends though main piston 102.

In the assembled state depicted in FIG. 3, piston rod 34 is passed though central opening 116 of main piston 102 so that main piston 102 encircles and radially outwardly projects from piston rod 34 proximal of head 70. Seal 114 is biased in sealed engagement against interior surface 14 of sidewall 18 so as to enable main piston 102 to freely slide within chamber 16 as piston rod 34 is moved within chamber 16.

In one embodiment of the present invention means are provided for enabling fluid flow through rebound port 122 from proximal face 108 to distal face 110 while precluding fluid flow from distal face 110 to proximal face 108. By way of example and not by limitation, a plurality of stacked shims 124 encircle piston rod 34 and bias against distal face 110 of main piston 102. Stacked shims 124 cover the distal opening to rebound ports 122 but do not cover the openings to compression ports 118. A washer 126 is disposed between head 70 and stacked shims 124 so as to provide space for the outer perimeter of stacked shims 124 to flex distally. Fluid can thus travel in a distal direction through rebound ports 122 by flexing shims 124, but is precluded from traveling in a proximal direction through rebound ports 122 as a result of shims 124. Shims 124 thus act as a type of one-way check valve during compressive movement of piston rod 34 and pressure sensitive valves during the rebound movement of piston rod 34. That is, the greater the fluid pressure against shims 124 during the rebound stroke, the farther shims 124 flex and the more rebound ports 122 are opened.

In alternative embodiments of the means for enabling fluid flow through rebound port 122, it is appreciated that shims 124 can be replaced with any number of alternative one-way check valve designs. For example, flexible shims 124 can be replaced with a solid washer or hinged flaps that are biased against distal face 110 over rebound ports 122 by a spring. One such example is discussed below with regard to FIG. 29. It is noted that there are a number of different elements and alternative designs disclosed herein which incorporate flexible shims as a one-way check valve. It is appreciated that each such use of shims is intended to have a corresponding means for enabling fluid flow in a select direction and that such shims can be replaced with alternative one-way check valve designs as discussed above.

Depicted in FIG. 2, valve guide 104 comprises an annular base 130 having a proximal face 132 and an opposing distal face 134. Projecting from distal face 132 is an annular stem 136. Stem 136 has an outer diameter smaller than the outer diameter of base 130. A central opening 138 extends through both stem 136 and base 130. In the assembled state depicted in FIG. 3, piston rod 34 is passed through central opening 138 so that distal face 134 of valve guide 104 rests against proximal face 108 of main piston 102. Valve guide 104 only partially covers pockets 120 so that fluid communication is still made with rebound ports 122 though pockets 120. It is noted that valve guide 104 is locked in place by being clamped between a shoulder 181 formed on piston rod 34 and main piston 102. In alternative embodiments, it is appreciated that valve guide 104 can be directly secured to or integrally formed with main piston 102.

Depicted in FIGS. 2 and 3, control valve 106 has an annular peripheral side 144 extending between an annular distal face 146 and an annular proximal face 148. Distal face 146 has a surface area smaller than the surface area of proximal face 148. In one embodiment, the aspect ratio of the surface area of distal face 146 to the surface area of proximal face 148 is in a range between about 0.3 to about 0.6 with about 0.3 to about 0.4 being more preferred. In general, control valve 106 comprises an annular collar 150 having an interior surface 152. An annular flange 154 radially inwardly projects from interior surface 152 of collar 150 at a proximal end thereof. Flange 154 has a proximal face 155 that terminates at an interior surface 157. A central opening 156 extends through both collar 150 and flange 154.

In the assembled state, piston rod 34 is slideably received within central opening 156 so that control valve 106 slideably mates with valve guide 104. Specifically, in the position depicted in FIG. 3, collar 150 of control valve 106 encircles base 130 of valve guide 104. An annular groove 158 is formed on interior surface 152 of collar 150 and receives an annular first seal 160. First seal 160 biases against base 130 of valve guide 104 so as to form a slideable sealed engagement between collar 150 and base 130.

Flange 154 of control valve 106 encircles stem 136 of valve guide 104. An annular groove 162 is formed on interior surface 157 of flange 154 and receives an annular second seal 164. Second seal 164 biases against stem 136 of valve guide 104 so as to form a slideable sealed engagement between flange 154 and stem 136. It is noted that in several of the other drawings showing control valve assembly 100, first seal 160 and second seal 164 are not shown in their corresponding grooves. This was done so as to help clarify the drawings. It is appreciated that in use, however, seals 160 and 164 are disposed within their corresponding grooves in each control valve assembly 100.

An annular groove 166 is also formed on the interior surface of control valve 106 between first seal 158 and second seal 164. In part, groove 166 bounds a valve chamber 170 formed between control valve 106 and valve guide 104 and which is sealed closed by first seal 158 and second seal 164. Disposed within valve chamber 170 is a compressible gas such as air. In one embodiment, as control valve 106 is received over valve guide 104, air is captured within valve chamber 170 at a first pressure, i.e., atmospheric pressure. In alternative embodiments, it is appreciated that a resiliently compressible member such as a spring or compressible material can also be disposed within valve chamber 170 so as to bias between valve guide 104 and control valve 106.

As depicted in FIG. 2, annular stop plate 174 has a distal side 176 and an opposing proximal side 178. A central opening 180 and a plurality of radially spaced apart ports 182 extend through stop plate 174 between opposing sides 176 and 178. As depicted in FIG. 3, distal end 48 of base rod 42 is passed through central opening 180 such that stop plate 174 is captured between a shoulder 181 of base rod 42 and valve guide 104.

Stop plate 174 functions as a stop for control valve assembly 100. Specifically, control valve assembly 100 operates at various states between an open position and a closed position. In the closed position depicted in FIG. 3, distal face 146 of control valve 106 biases against proximal face 108 of main piston 102 so as to cover the proximal openings to compression ports 118. However, a portion of pockets on main piston 102 are not covered by control valve 106 or valve guide 104 so that open fluid communication is provided to rebound ports 122 through pockets 120. As discussed below in greater detail, it is also noted that when control valve 106 is in the closed position, valve chamber 170 is collapsed so as to have a first volume.

Figure 4:
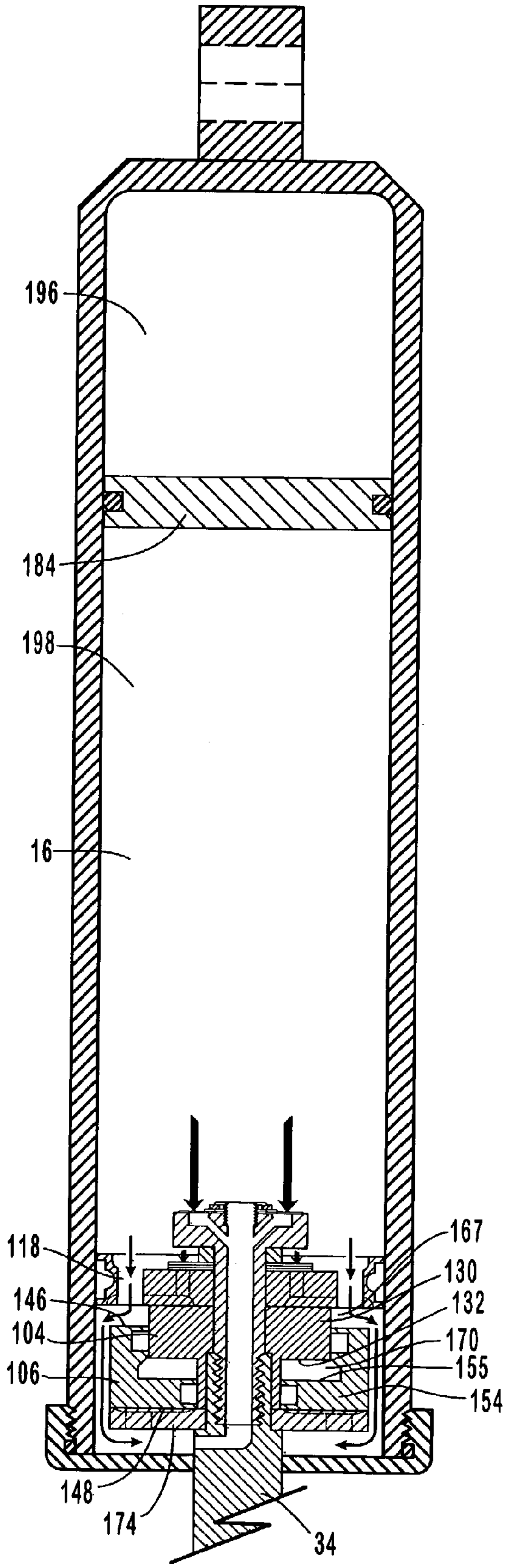
FIG. 4 is a cross sectional side view of the damper shown in FIG. 1 with the control valve in an open state.

Depicted in FIG. 4, control valve assembly 100 is in the fully open position. In this configuration, control valve 106 has slid proximally relative to valve guide 104 so that proximal face 148 of control valve 106 is biased against stop plate 174, thereby stopping further proximal movement of control valve 106. In this open position, control valve 106 is spaced apart from main piston 102 so that fluid is free to travel through the compression ports 118 and through a flow channel 167 formed between control valve 106 and main piston 102. It is also noted that in the open position, distal face 155 of flange 154 of control valve 106 is spaced apart from proximal face 132 of base 130 of valve guide 104, thereby expanding valve chamber 170 so as to have a second volume that is lager than the first volume. The pressure in valve chamber 170 is greater in the collapsed state than in the expanded state. As such, the pressure within valve chamber 170 has the natural tendency to push control valve 106 into the open position under a force corresponding to the relative pressure within valve chamber 170.

Returning to FIG. 1, slideably disposed within chamber 16 distal of piston rod 34 is a floating piston 184. Floating piston 184 has a peripheral side 186 that extends between a distal face 188 and an opposing proximal face 190. A seal 192 is disposed on peripheral side 186. Seal 192 biases in sealed engagement against interior surface 14 of sidewall 18 of housing 12 so as to enable floating piston 184 to selectively slide within chamber 16 but substantially precluding fluid or gas from passing through or around floating piston 184.

Floating piston 184 divides chamber 16 into a distal compartment 196 and a proximal compartment 198. Compartments 196 and 198 each change in relative size as floating piston 184 slides within chamber 16. Disposed within distal compartment 196 is a compressible gas, such as air, while disposed within proximal compartment 198 is a hydraulic fluid. As used in the specification and appended claims, the term "hydraulic fluid" is intended to include all types of fluids that can be used to transfer hydraulic pressures. Although hydraulic fluids are generally considered as being substantially non-compressible, it is appreciated that hydraulic fluids can be emulsified or have entrained gas, thereby making them slightly compressible.

The gas within distal compartment 196 is disposed at a second pressure that is greater than the first pressure of the gas within valve chamber 170. Accordingly, in the static position shown in FIG. 1 with piston rod 34 retracted out of chamber 16, control valve 106 is in the closed position. That is, the pressure within distal compartment 196 is transferred through floating piston 184 and the hydraulic fluid within proximal compartment 198 so to collapse valve chamber 170 and move valve guide 106 into the closed position.

In general, control valve 106 is closed because of the opposing forces applied by the hydraulic fluid on distal side 134 of valve guide 104 and on proximal face 148 of control valve 106. Although not required, it has been empirically determined that control valve assembly 100 more effectively operates under the applied pressures to move between the open and closed positions if the surface area of distal side 134 of valve guide 104 is at least 50%, preferably at least 60% and more preferably at least 70% of the surface area of proximal face 148 of control valve 106.

During operation, when a force is applied to proximal end 37 of piston rod 34 which is greater than the force which is maintaining control valve assembly 100 in the closed position, piston rod 34 with main piston 102 and control valve assembly 100 begin to move distally within chamber 16. Specifically, as depicted in FIG. 4, as piston rod 34 moves distally within chamber 16, the hydraulic fluid within proximal compartment 198 travels through compression ports 118 and pushes against distal face 146 of control valve 106, thereby causing control valve 106 to at least partially slide into the open position.

Control valve assembly 100 meters the flow of hydraulic fluid through compression ports 118 during the advancement of main piston 102. The extent to which control valve 106 slides distally in part depends on the rate and magnitude of the force applied to piston rod 34. For example, if a large force is rapidly applied to piston rod 34, i.e., sharp hi-speed bump force, control valve assembly 100 is quickly moved to the fully open position as a result of the high pressures that are produced in proximal compartment 198 and applied to distal face 146 of control valve 106. The hydraulic fluid can thus freely travel through compression ports 118 and around control valve 106, thereby allowing piston rod 34 to rapidly and easily advance within chamber 16. As such, the impact of the initial force on piston rod 34 is quickly absorbed by movement of piston rod 34. In contrast, if a gradual small force is applied to piston rod 34, control valve 106 is only partially moved to the open position so that flow passageway 167 remains partially constricted. This constriction of flow passageway 167 decreases the flow of hydraulic fluid through compression ports 118 and thus slows of movement of main piston 102 within chamber 16.

Figure 5:
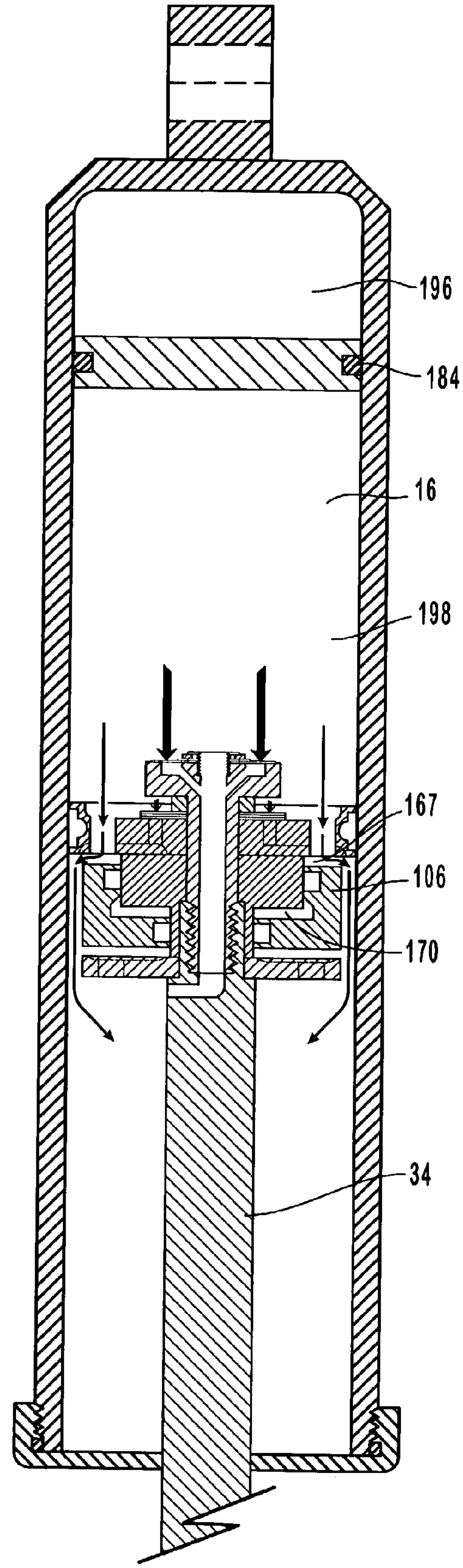
FIG. 5 is a cross sectional side view of the damper shown in FIG. 4 with the piston rod being advanced into the housing.

As depicted in FIG. 5, as more of piston rod 34 enters proximal compartment 198, piston rod 34 displaces a corresponding volume of the hydraulic fluid therein. Because the hydraulic fluid does not significantly compress, the hydraulic fluid causes floating piston 184 to slide distally and compress the gas with distal compartment 196. As the gas pressure increases within distal compartment 196, the fluid pressure within proximal compartment 198 increases and the fluid pressure begins to collapse valve chamber 170, thereby moving control valve 106 into the closed position. As control valve 106 moves into the closed position, flow channel 167 constricts making it more difficult for the hydraulic fluid to pass therethrough. Accordingly, the farther piston rod 34 advances into chamber 16, the greater the resistance force that is applied against piston rod 34.

Figure 6:
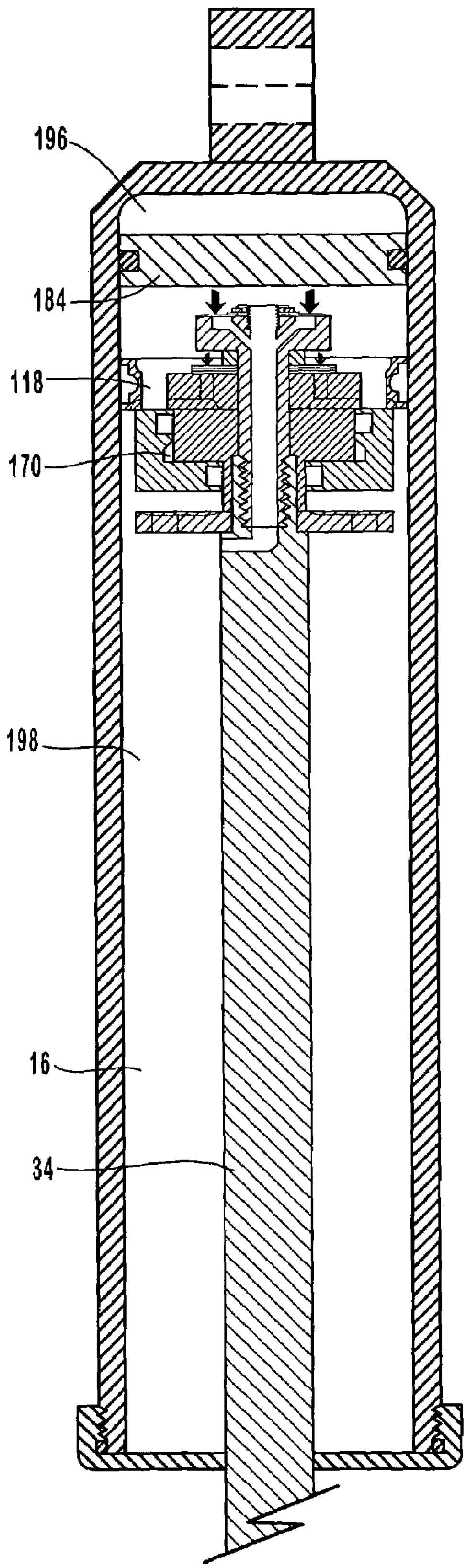
FIG. 6 is a cross sectional side view of the damper shown in FIG. 5 with the piston rod fully advanced into the housing.

As depicted in FIG. 6, piston rod 34 is stopped from further advancement into chamber 16 when control valve assembly 100 returns to the closed position. This occurs when a sufficient length of piston rod 34 has entered proximal compartment 198 such that the hydraulic fluid pressure tending to move control valve assembly 100 into the closed position, thereby precluding fluid travel through compression ports 118, is greater than the external force applied to piston rod 34 which tends to cause the hydraulic fluid to move the control valve into the open position.

As will be discussed below, in alternative embodiments the initial pressure within and the volume of distal compartment 196 can be selectively adjusted. The initial pressure and volume of distal compartment 196 has a number of effects on the damping. For example, by increasing the initial pressure within distal compartment 196, increased force is initially applied by the hydraulic fluid to maintain control valve assembly 100 in the closed position. As such, greater force to piston rod 34 is required to initially move control valve assembly 100 into the open position.

Furthermore, having a higher initial pressure within distal compartment 196 causes control valve assembly 100 to close earlier as piston rod 34 is advanced into proximal compartment 198. That is, the gas pressure within distal compartment 196, and thus also the hydraulic fluid pressure within proximal compartment 198, increases exponentially as the volume of distal compartment 196 is compressed. The increase in pressure is based on the compression ratio of distal compartment 196, i.e., the starting volume of distal compartment 196 versus the final volume of distal compartment 196 when piston rod 34 is advanced into chamber 16. For example, if the starting volume of distal compartment 196 is 100 cc and the final volume is 25 cc, the compression ratio is 4:1. As a result, the gas pressure and thus also the hydraulic fluid pressure in the final volume is four times the gas pressure in the starting volume. The pressure continues to increase exponentially as the volume of distal compartment 196 decreases by compression.

It is also appreciated that the starting volume of distal compartment 196 can be adjusted separately from the initial pressure therein so as to separately effect the damping properties. For example, in a first embodiment the initial volume of distal compartment 196 can be 100 cc while in a second embodiment the initial volume can be 75 cc. Assuming the starting gas pressure in each embodiment is the same, the same initial force is applied to control valve 100 as discussed above. However, for the same advancement of piston rod 34 in each of the embodiments, the compression ratio for the second embodiment is greater because the initial volume is smaller. As such, the rate of pressure increase and resulting damping force is greater for the second embodiment relative to the first embodiment.

In view of the foregoing, during a compressive movement of main piston 102, a virtually infinite combination of pressures can be applied to control valve assembly 100 as a result of: displacement of piston rod 34 and the resulting pressure changes within chamber 16; varying bump loads and resulting pressures that are generated within the chambers on each side of main piston 102; and the resulting pressures that are variably generated upon distal face 134 of valve guide 104 and proximal face 148 of control valve 106 through out the stroke of piston rod 34.

The resulting metering of hydraulic fluid flow through pressure ports 118 on main piston 102 by control valve assembly 110 during a compressive movement of main piston 102 thus produces damping effects which are: position sensitive as a result of the position of piston rod 34 within proximal compartment 198; variable position and load sensitive depending on the position of main piston 102, speed/force of the bump input, and pressure within the distal compartment 196; and position and/or load adjustable, by varying the volume and force of the pressure within distal compartment 196.

Figure 7:
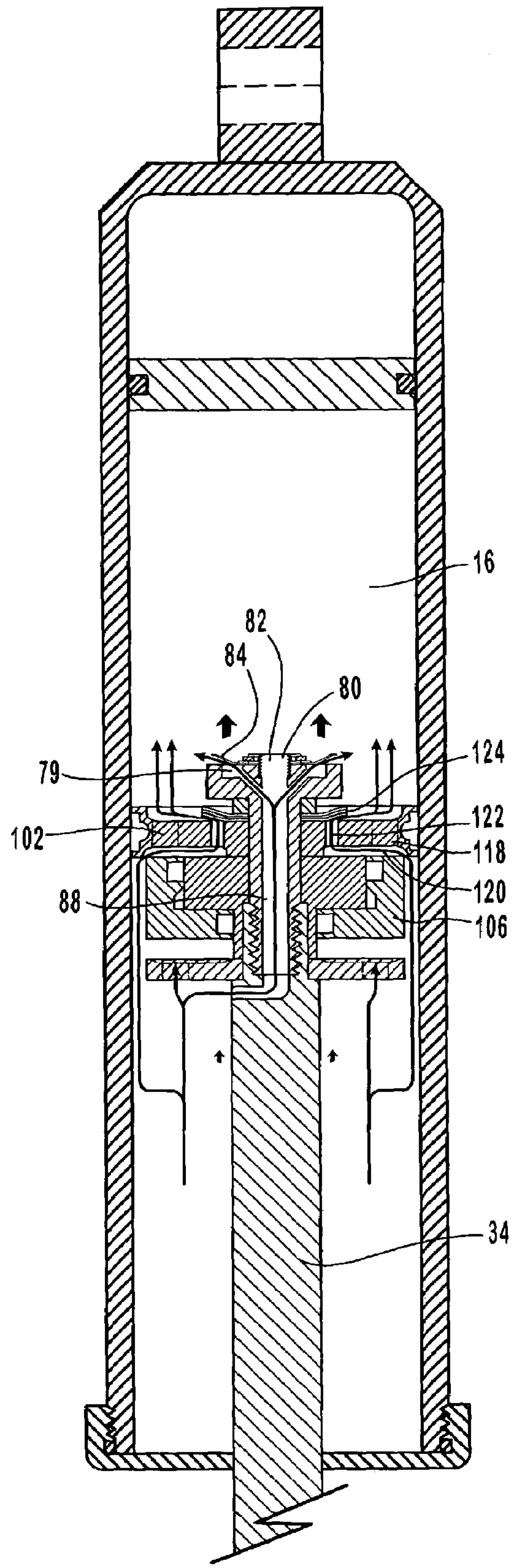
FIG. 7 is a cross sectional side view of the damper shown in FIG. 6 with the piston rod being retracted out of the housing.

Depicted in FIG. 7, during rebound when piston rod 34 is being drawn out of chamber 16, the pressure applied by the hydraulic fluid keeps control valve assembly 100 closed, thereby preventing the hydraulic fluid that is now proximal of control valve 106 from passing through compression ports 118. Rather, the hydraulic fluid flows through one of possibly three rebound paths. In a first path, the hydraulic fluid enters rebound channel 88 proximal of stop plate 174, travels centrally through piston rod 34 along rebound channel 88, and then travels out through ports 79 by distally flexing shims 84. In a second rebound path, rather then traveling out through ports 79, the hydraulic fluid within rebound channel 88 travels out through jet 80. In the third rebound path, the hydraulic fluid travels around the exterior of control valve 106 and enters pockets 120 of main piston 102. The hydraulic fluid then travels out through rebound ports 122 by distally flexing shims 124.

By adjusting the stiffness and/or number of shims 84, 124 and the size of opening 82 in jet 80, the hydraulic fluid can simultaneously flow through one, two, or all three of the rebound paths. For example, by having shims 124 stiffer than shims 84, the hydraulic fluid may flow only through jet 80 at low rebound forces. At a higher rebound force, the hydraulic fluid may flow through both the first and second rebound path or through all three rebound paths.

The rebound force, typically produced by an opposing spring, is generally greatest when piston rod 34 is fully inserted into chamber 16 (FIG. 6) and initially begins to move in the rebound direction. As such, all of the rebound paths may initially be used as piston rod 34 begins to retract. However, as piston rod 34 continues to move in the rebound direction, one or more of the rebound paths may close off, thereby slowing the rebound as piston rod 34 approaches the fully retracted position. As will be discussed below with regard to alternative embodiments, rebound channel 88 can also be selectively restricted or closed so as to enable manual control of the hydraulic fluid therethrough based on operating parameters.

As discussed above, the compressible gas is sealed within distal compartment 196 so as to enable piston rod 34 to travel into chamber 16 through the compression of the gas and to at least partially control the operation of control valve assembly 100 by producing variable pressure thereon. It is appreciated, however, that there are a number of alternative ways in which these same functions can be achieved.

Figure 8:
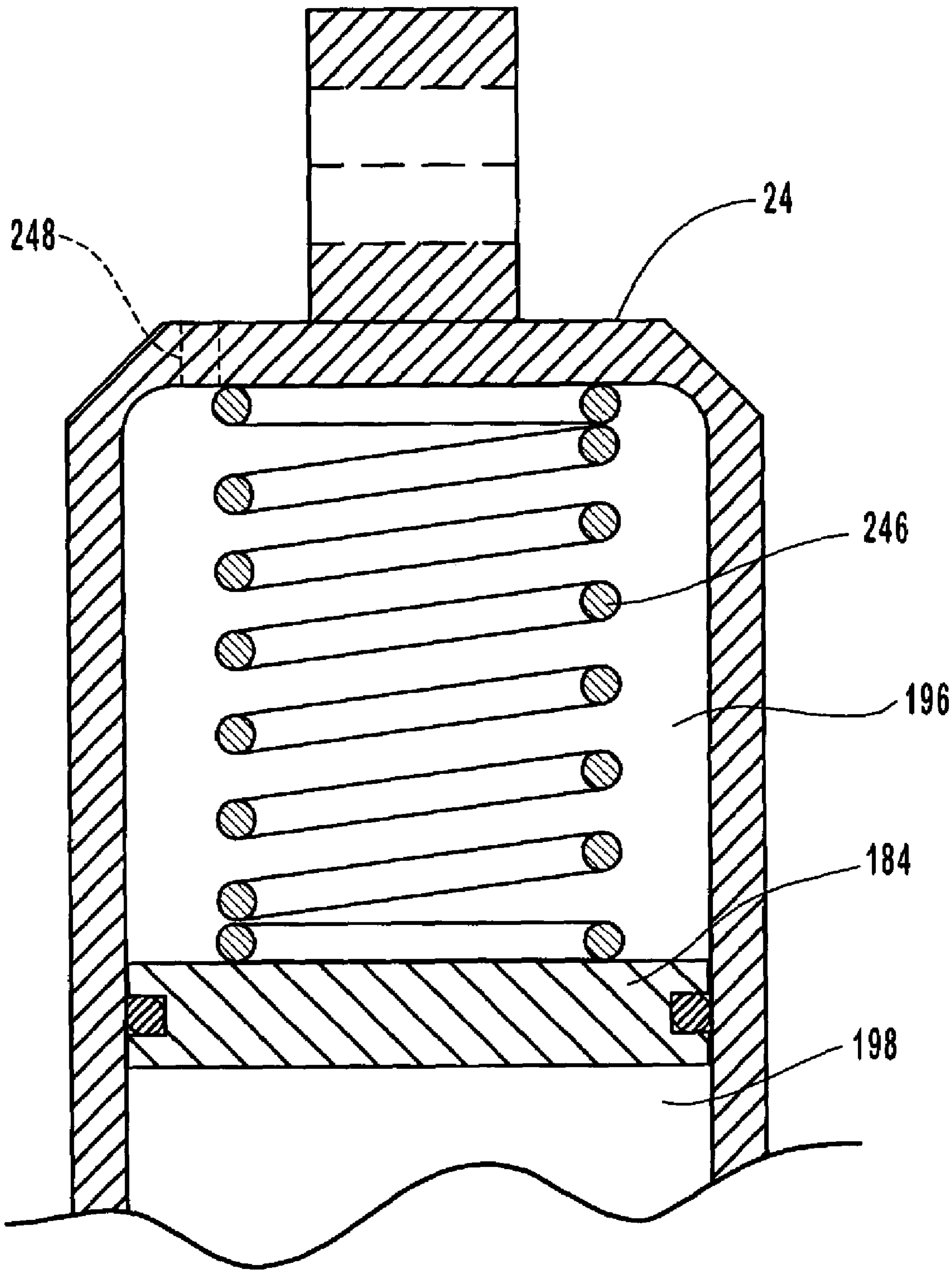
FIG. 8 is a cross sectional side view of a spring biased against the floating piston at the distal end of the damper shown in FIG. 1.

For example, depicted in FIG. 8 a resiliently compressible member 246 is disposed within distal compartment 196. Member 246 extends between floating piston 184 and distal end wall 24. Although member 246 is shown as being a coiled spring, in alternative embodiments member 246 can comprise other forms of mechanical springs or blocks of resiliently compressible material such as rubber or polymeric foam. As the hydraulic pressure increases in proximal chamber 198, floating piston 184 slides distally resiliently compressing member 246. In this regard, compressed member 246 functions similar to the compressed gas.

It is appreciated that member 246 can be used in addition to or independent of filling distal compartment 196 with a gas at elevated pressure. Where member 246 is independently used to provide the compressive resistance, distal compartment 196 need not be sealed closed within housing 12. For example an opening depicted by dashed lines 248 can be formed through distal end wall 24. Opening 248 facilitates proper placement of floating piston 184. In other embodiments, it is appreciated that member 246 need not be disposed within chamber 16 but can be disposed outside of chamber 16. For example, a rod can extend from floating piston 184 through distal end wall 24 where it connects with member 246 outside of housing 12.

Figure 9:
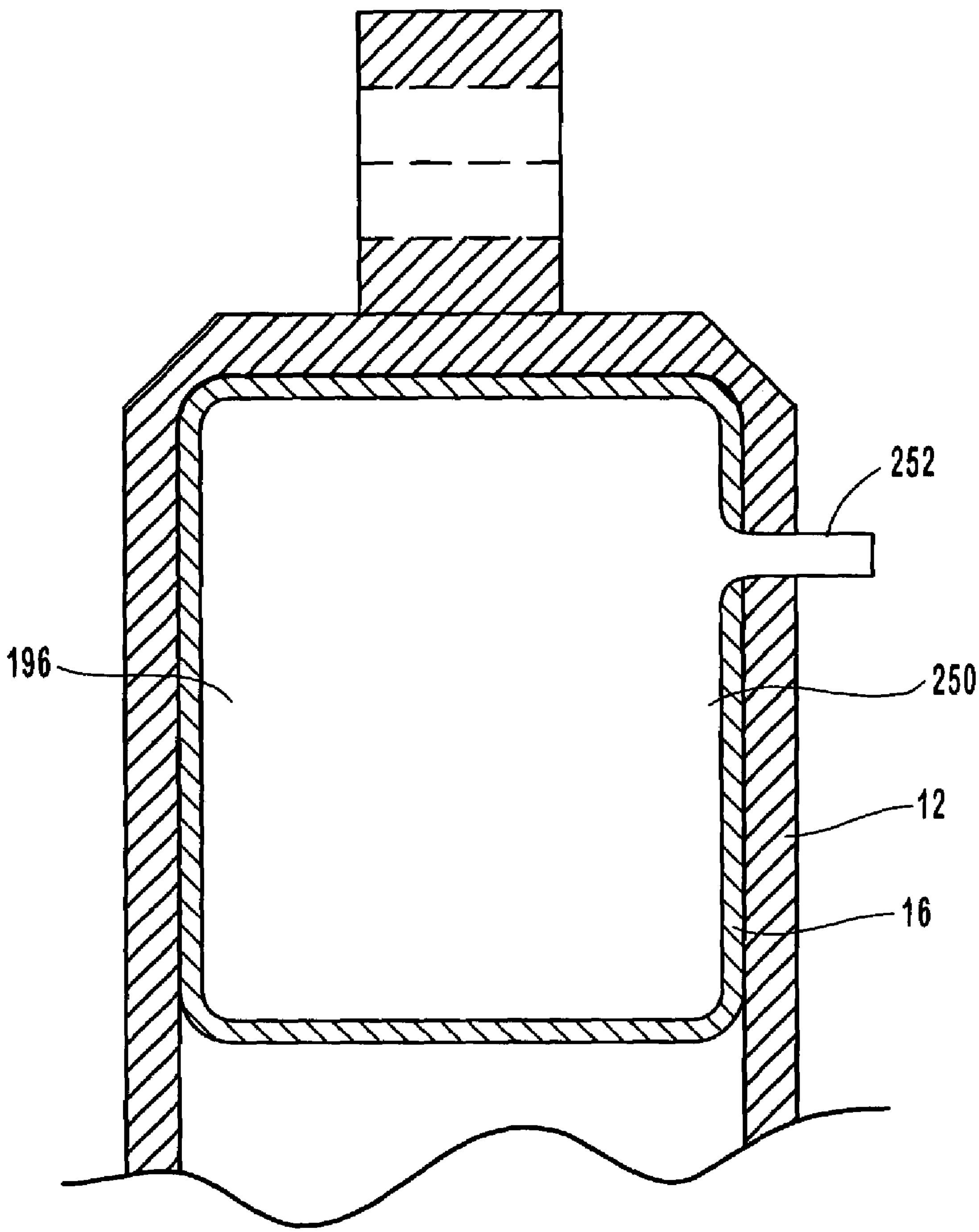
FIG. 9 is a cross sectional side view of an inflated bladder disposed at the distal end of the damper shown in FIG. 1.

In another alternative embodiment depicted in FIG. 9, a flexible bladder 250 is disposed within the distal end of chamber 16. Bladder 250 communicates with the exterior of housing 12 through a fill valve 252 such as Schrader charge valve. Fill valve 252 enables bladder 250 to be selectively inflated with gas to a desired pressure. It is noted that bladder 250 can be used in association with or independent of floating piston 184. That is, floating piston 184 can be eliminated so that the hydraulic fluid directly bears against inflated bladder 250 so as to compress bladder 250. In this embodiment, bladder 250 bounds distal compartment 196. Bladder 250 can also be filled with resiliently compressible material such as rubber or polymeric foam.

Figure 10:
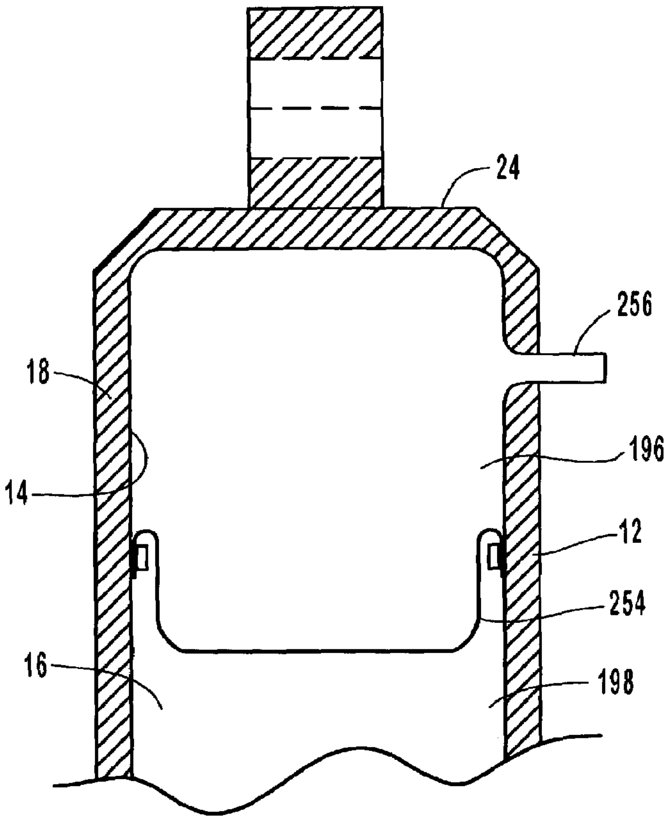
FIG. 10 is a cross sectional side view of a flexible diaphragm disposed at the distal end of the damper shown in FIG. 1.

Depicted in FIG. 10, floating piston 184 is replaced with a flexible diaphragm 254. Diaphragm 254 is mounted to interior surface 14 of sidewall 18 of housing 12 so as to divide chamber 16 into distal compartment 196 and proximal compartment 198. A fill valve 256 is formed on sidewall 18 and enables distal compartment 196 to be filled with a compressible gas to a desired pressure. Again, as piston rod 34 is advanced into chamber 16, the hydraulic fluid presses against diaphragm 254 causing it to flex distally, thereby compressing the gas within distal compartment 196.

Figure 11:
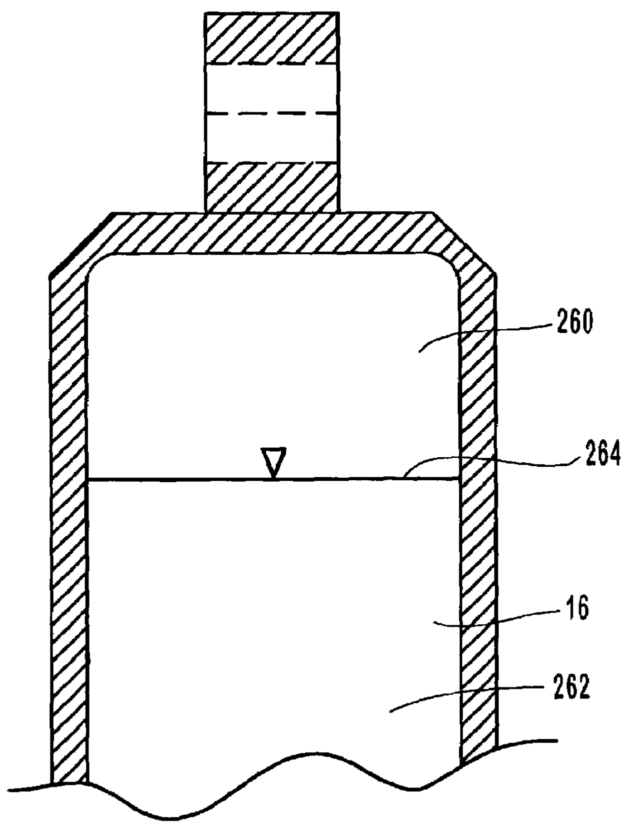
FIG. 11 is a cross sectional side view of a boundary line between a hydraulic fluid and a compressible gas disposed at the distal end of the damper shown in FIG. 1.

It is appreciated that in other embodiments no mechanical barriers are required. For example, depicted in FIG. 11 chamber 16 is filled with a gas 260, such as air, and a hydraulic fluid 262. A boundary line 264 is formed therebetween. As piston rod 34 enters chamber 16, hydraulic fluid 262 compresses gas 260. In some uses, however, this embodiment is less desirable as the gas and hydraulic fluid can mix or emulsify within chamber 16 and diminish operating properties.

Figure 12:
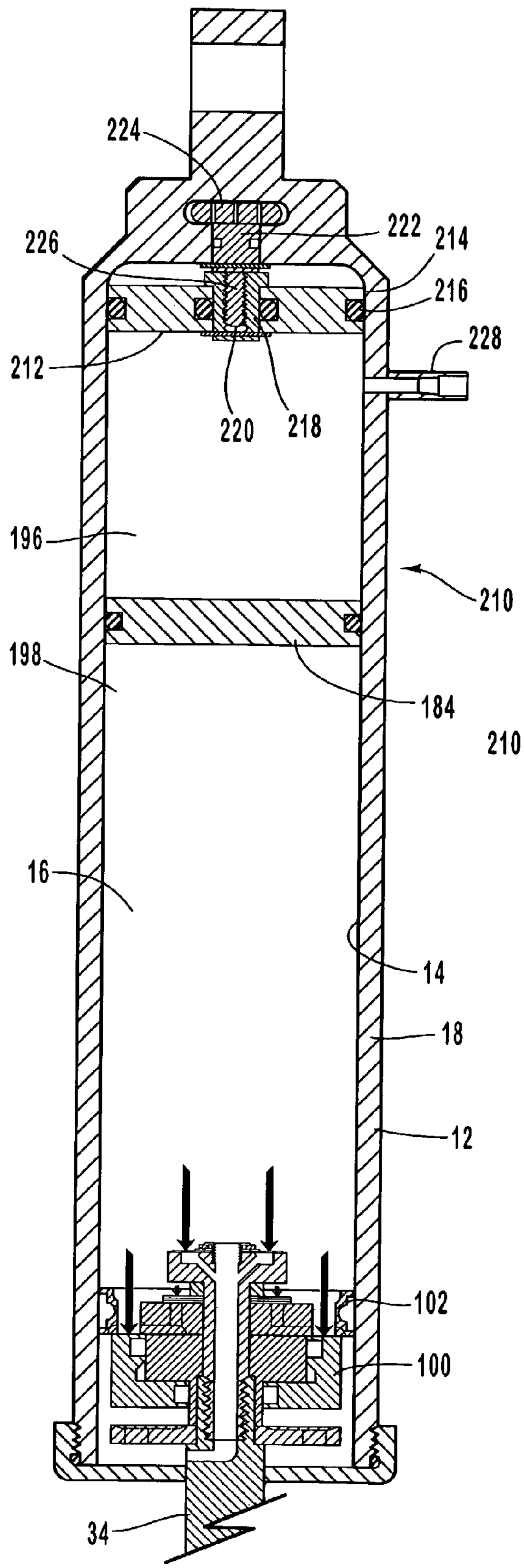
FIG. 12 is a cross sectional side view of an alternative embodiment of a damper having an adjusting piston.

Set forth below are a number of alternative embodiments of dampers wherein like elements are identified by like reference characters. In one embodiment of the present invention means are provided for selectively adjusting the size of distal compartment 196. By way of example, depicted in FIG. 12 is a damper 210. Damper 210 is substantially identical to damper 10 except that damper 210 includes an adjusting piston 212 disposed within chamber 16 distal of floating piston 184. Adjusting piston 212 includes a peripheral side 214 having a seal 216 formed thereat. Seal 216 is biased in sealed engagement against interior surface 14 of sidewall 18 of housing 12 so as to enable adjusting piston 212 to selectively slide within chamber 16 without allowing fluid to pass through or around.

Centrally mounted on adjusting piston 212 is a sleeve 218. Sleeve 218 has a threaded bore 220 which opens distally. In alternative embodiments, it is appreciated that threaded bore 220 can be formed directly on the distal face of adjusting piston 212.

Figure 13:
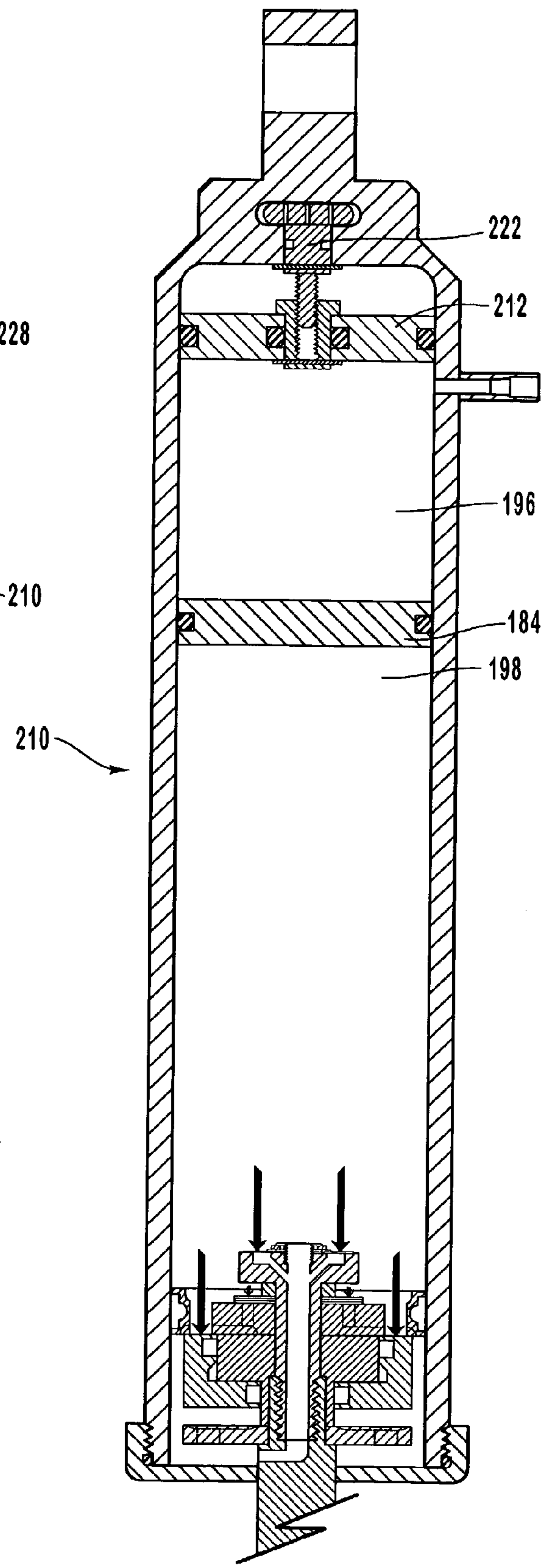
FIG. 13 is a cross sectional side view of the damper shown in FIG. 12 with the adjusting piston moved to a second position.

Mounted on housing 12 is a knob 222. Knob 222 has a first end with an enlarged head 224 formed thereat. Head 224 is at least partially exposed outside of housing 12 so as to enable selective, manual rotation of head 224. A threaded shaft 226 is formed at an opposing second end of knob 222. Threaded shaft 226 is threadedly engaged with bore 220 on piston 212. Accordingly, as depicted in FIGS. 12 and 13, by selectively rotating head 224 of knob 222, adjusting piston 212 is selectively advanced and retracted within the distal end of chamber 16.

In this embodiment, distal compartment 196 is bounded between adjusting piston 212 and floating piston 184. By manually advancing adjusting piston 212 toward floating piston 184, distal compartment 196 becomes smaller. By making distal compartment 196 smaller, the gas pressure can be increased therein and the rate at which the pressure increases within proximal compartment 198 as floating piston 184 moves distally increases. Alternative embodiments of the means for selectively adjusting the size of distal compartment are discussed below.

Also mounted on housing 12 so as to communicate with distal compartment 196 is a fill valve 228. As previously discussed, fill valve 228 can comprise a conventional air valve such as used on car and bike tires. Fill valve 228 can thus be used to selectively increase or decreases the gas pressure within distal compartment 196. For example, air can be added to or removed from distal compartment 196 so as to selectively increase or decrease the gas pressure therein. Again, as previously discussed, the gas pressure affects the operation of control valve 100 and thus the movement of piston rod 34. Accordingly, adjusting piston 212 and fill valve 228 enable an end user to selectively adjust dampening properties of damper 210 based on current or expected operating parameters.

Figure 14:
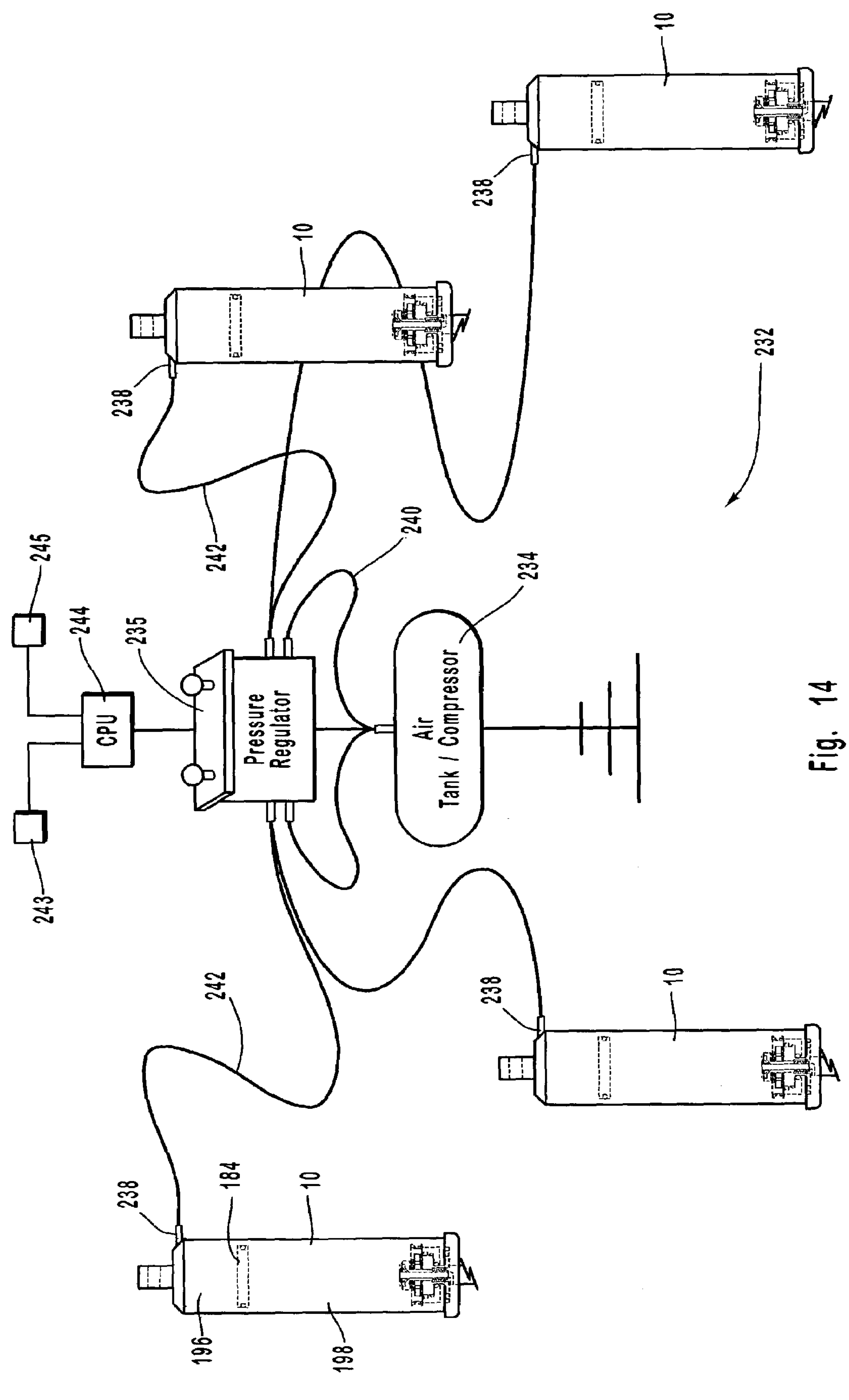
FIG. 14 is a schematic representation of a remote pressure regulated dampening system.

In one embodiment of the present invention, means are provided for remotely adjusting the fluid pressure of the hydraulic fluid within proximal compartment 198 of damper 10. By way of example and not by limitation, depicted in FIG. 14 is one embodiment of a pressure regulated damping system 232. Dampening system 232 includes means for providing a compressed gas. Examples of such means includes air source 234 which can comprise a compressor or tank holding compressed gas. Damping system 232 further comprises a pressure regulator 235 and one or more of dampers 10. A port 238 is provided in gas communication with distal compartment 196 of each damper 10. Supply lines 240 provide gas communication between air source 234 and pressure regulator 235. In turn, supply lines 242, such as tubes or any other form of conduit, provide gas communication between pressure regulator 235 and distal compartment 196 of each damper 10 by way of port 238.

Regulator 235 can be manually, electronically, and/or computer controlled so as to selectively or automatically adjust the pressure independently within distal compartment 196 of each damper 10 as the operating environment for dampers 10 change. By increasing the pressure in distal compartment 196, the pressure differential is transferred through floating piston 184 so as to increase the fluid pressure of the hydraulic fluid within proximal compartment 198. In turn, increasing the hydraulic fluid pressure adjusts the operation of control valve 100 and thus the damping properties of damper 10. It is appreciated that regulator 235 can come in a variety of different configurations and can be comprised of multiple discrete components.

As one example of use, one or more dampers 10 can be incorporated into the shock absorbers of an automobile or any other type of vehicle. As road and operating conditions change, for example, straight versus curvy, on-road versus off-road, accelerating versus breaking, the rapid remote adjustment of the hydraulic fluid pressure can be used to provide optimum suspension performance. It is appreciated that optimum performance will often be obtain by simultaneously separately adjusting the hydraulic fluid pressure in each of dampers 10 on a vehicle.

To facilitate automatic damping adjustment, one or more sensors 243, such as a gyroscopic sensor or other movement sensitive sensors, can be mounted on the vehicle and in electrical communication with a central processing unit (CPU) 244. CPU 244 may be separate from or form a portion of regulator 235. Based on inputs from the one or more sensors 243, CPU 244 can control regulator 235 so as to accordingly adjust the gas pressure and resulting hydraulic fluid pressure in one or more of dampers 10 on the vehicle.

As an alternative to automatic adjustment, a manual input mechanism 245, such as a switch or control panel, can be electrically coupled with CPU 244. Inputs provided to manual input mechanism 245 can be used to set the hydraulic fluid pressure in each of dampers 10 to a predefined valve.

The use of gas pressure is only one example of the means for remotely adjusting the fluid pressure of the hydraulic fluid within proximal compartment 198 of damper 10. As an alternative embodiment, spring 246 of FIG. 8 can be disposed between floating piston 184 and adjusting piston 212 of FIG. 12. In turn, a motor or other form of gear mechanism is attached knob 222 in FIG. 12. Central processing unit 244 is electrically coupled with the motor such that based on sensor or manual input signals the motor adjusts the compression on spring 246 so as to remotely adjust the hydraulic fluid pressure in dampers 10.

It is appreciated that there are a variety of different systems that can be used to remotely adjust the fluid pressure of the hydraulic fluid within dampers 10 by selectively adjusting the pressure applied to floating piston 184 or one of the alternatives discussed thereto.

In view of the foregoing the suspension of a vehicle can be controlled by providing a vehicle having a suspension system including at least one pressure regulated damper; and automatically or selectively delivering a gas to or withdrawing a gas from the at least one damper during operation of the vehicle so as to automatically or selectively control suspension performance properties of the at least one damper. Such suspension control can be performed during movement of the vehicle.

Likewise, suspension control can be obtained by automatically or selectively altering the fluid pressure of the hydraulic fluid within the at least one damper during operation of the vehicle so as to automatically or selectively control suspension performance properties of the at least one damper, the automatic or selective altering of the fluid pressure being based on automatic sensor signals or manual input signals.

Figure 15:
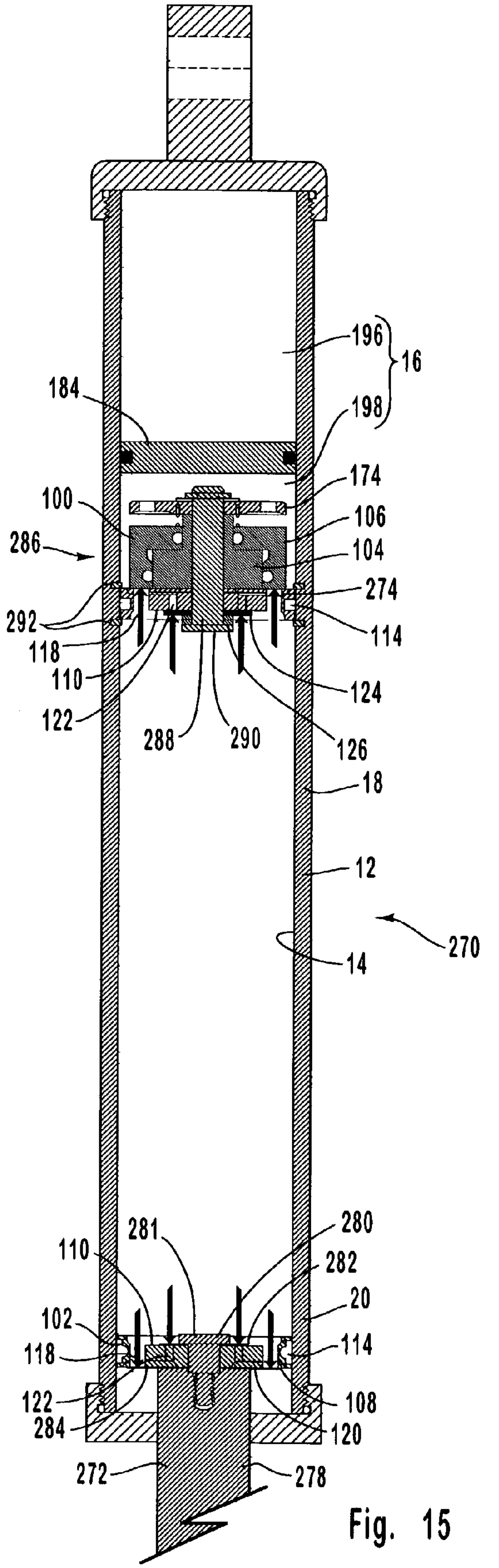
FIG. 15 is a cross sectional side view of an alternative embodiment of a damper having a fixed control valve assembly.

Depicted in FIG. 15 is another alternative embodiment of a damper 270 incorporating features of the present invention. Damper 270 includes housing 12 bounding chamber 16. Chamber 16 is divided by floating piston 184 into distal compartment 196 and proximal compartment 198 which contain a compressed gas and hydraulic fluid, respectively. Again, floating piston 184 can be replaced with any of the alternatives as previously discussed.

A piston rod 272 slideably extends into the proximal end of housing 12. Piston rod 272 includes a base rod 278 and a bolt 280. Bolt 280 is screwed onto the distal end face of base rod 278 so as to secure main piston 102 therebetween. Seal 114 is mounted on the peripheral side of main piston 102 and forms a slideable sealed biased engagement against interior surface 14 of sidewall 18.

Secured between an enlarged head 281 of bolt 280 and distal face 110 of piston 102 is a first shim 282. First shim 282 is biased against distal face 110 of piston 102 so as to cover the distal openings to rebound ports 122. A second shim 284 is disposed between the distal end of base rod 278 and proximal face 108 of piston 102. Second shim 284 is biased against proximal face 108 of piston 102 so as to cover the proximal openings of compression ports 118. However, second shim 284 only covers a portion of pockets 120 leading to rebound ports 122. As previously discussed with regard to shims 124 in FIG. 3, shims 282 and 284 function as one-way check valves which control the direction of flow through rebound ports 122 and compression ports 118, respectively. The alternatives as previously discussed with regard to shims 124 are also applicable to shims 282, 284, and the flexible shims disclosed in other embodiments of the present invention.

In contrast to damper 10 wherein control valve assembly 100 is mounted to the moveable piston rod, in the present embodiment control valve assembly 100 is mounted on a secondary piston 274 disposed within proximal compartment 198 between piston rod 272 and floating piston 184. Secondary piston 274 has the same configuration as main piston 102 and thus like reference characters are used to identify like elements. It is noted, however, that secondary piston 274 and control valve assembly 100 are rotated 180° relative to the corresponding structures in damper 10. As such, the proximal and distal orientations are reversed relative thereto.

Secondary piston 274 is secured in place by clips 292 which are received in grooves on interior surface 14 of sidewall 18 so as to bias against opposing sides of secondary piston 274. In alternative embodiments, clips 292 can be further spaced apart to allow some longitudinal sliding of secondary piston 274. In yet other embodiments, secondary piston 274 can be integrally formed with housing 12 so as to eliminate the need for seal 114 and clips 292. A shaft 288 extends through secondary piston 274 and control valve assembly 100 so as to secure the two elements together. Shims 124 bias against proximal face 110 of secondary piston 274 and are secured thereat by a head 290 of shaft 288 and washer 126. Stop plate 174 is mounted at the distal end of shaft 288 to control the distal movement of control valve 106. The combination of secondary piston 274, control valve 100 and stop plate 174 secured together by shaft 288 is herein referred to as base valve 286.

Figure 16:
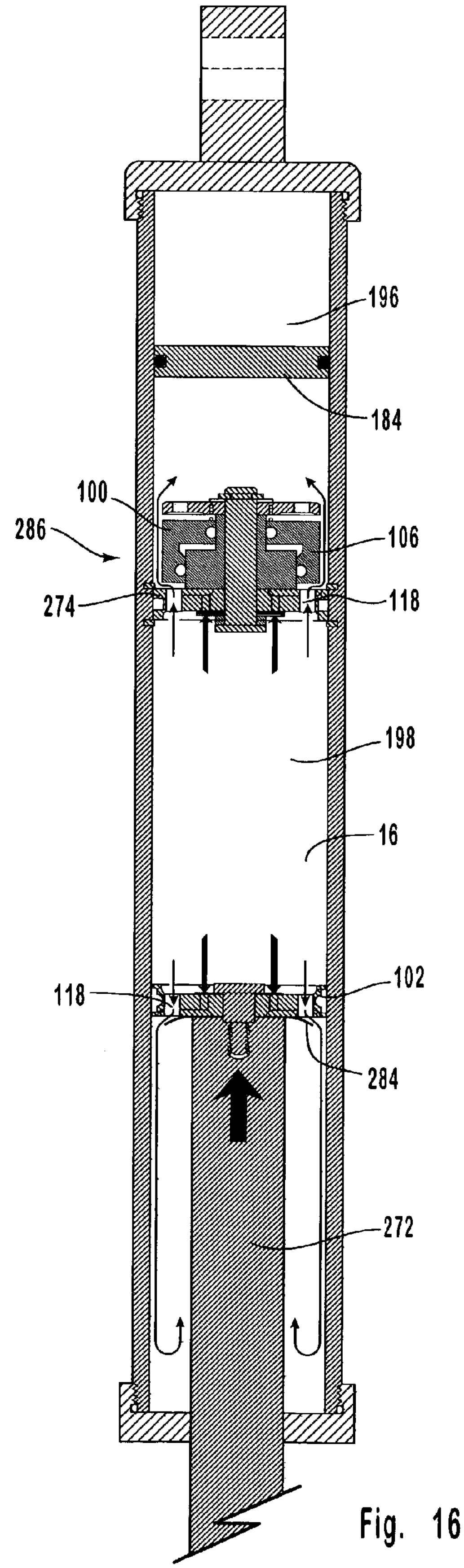
FIG. 16 is a cross sectional side view of the damper shown in FIG. 15 with the piston rod being advanced into the housing thereof.

As depicted in FIG. 16, as piston rod 272 advances into distal compartment 198 of chamber 16, the hydraulic fluid causes second shims 284 to proximally flex allowing the hydraulic fluid to travel through compression ports 118 of main piston 102. Simultaneously, the hydraulic fluid also moves control valve 106 of control valve assembly 100 into an at least partially open state so that the hydraulic fluid can pass through compression ports 118 of secondary piston 274. The hydraulic fluid then pushes floating piston 184 distally, thereby compressing the gas within distal compartment 196.

Figure 17:
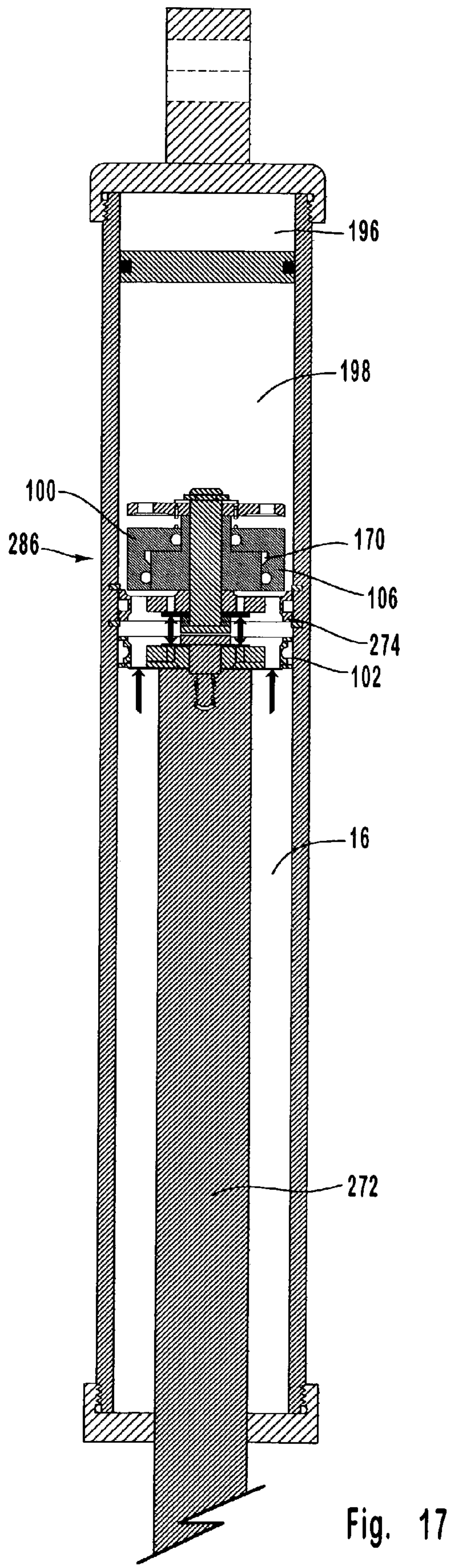
FIG. 17 is a cross sectional side view of the damper shown in FIG. 16 with the piston rod being fully advanced into the housing.
Figure 18:
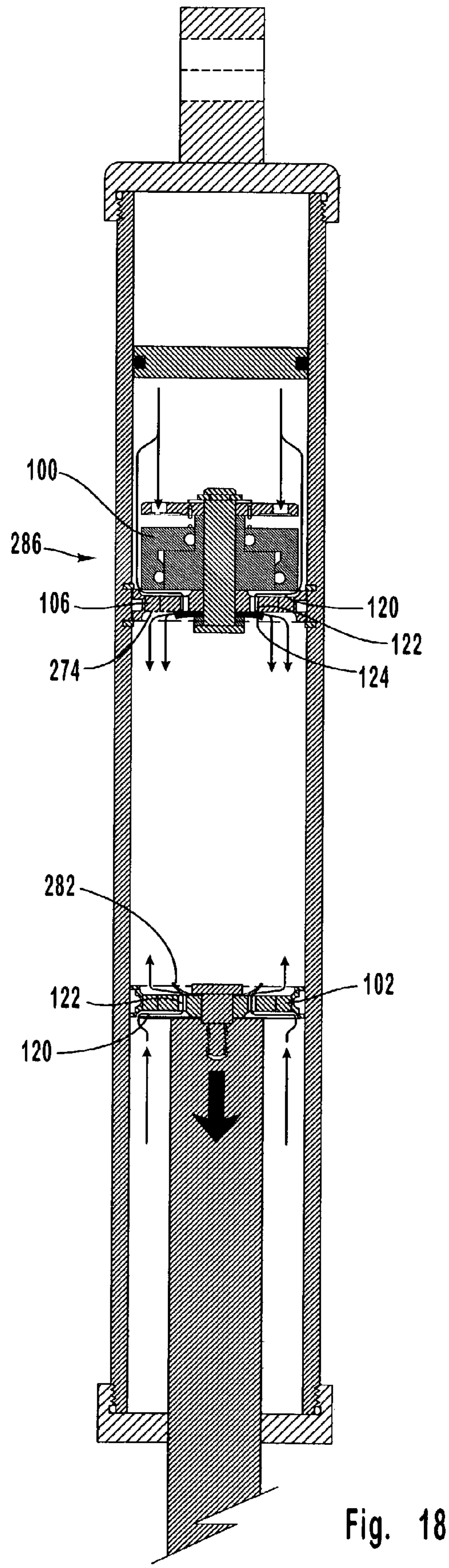
FIG. 18 is a cross sectional side view of the damper shown in FIG. 17 with the piston rod being retracted out of the housing.

Depicted in FIG. 17, when the compressive movement of piston rod 272 has stopped within chamber 16, the fluid pressure within proximal compartment 198 collapses valve chamber 170, thereby moving control valve 106 into the closed position. As depicted in FIG. 18, during the rebound stroke the hydraulic fluid travels through secondary piston 274 by flowing through pockets 120 and out through rebound ports 122 by proximally flexing shims 124. Similarly, the hydraulic fluid travels through main piston 102 by traveling through pockets 120 and out through rebound ports 122 by distally flexing shims 282.

Figure 19:
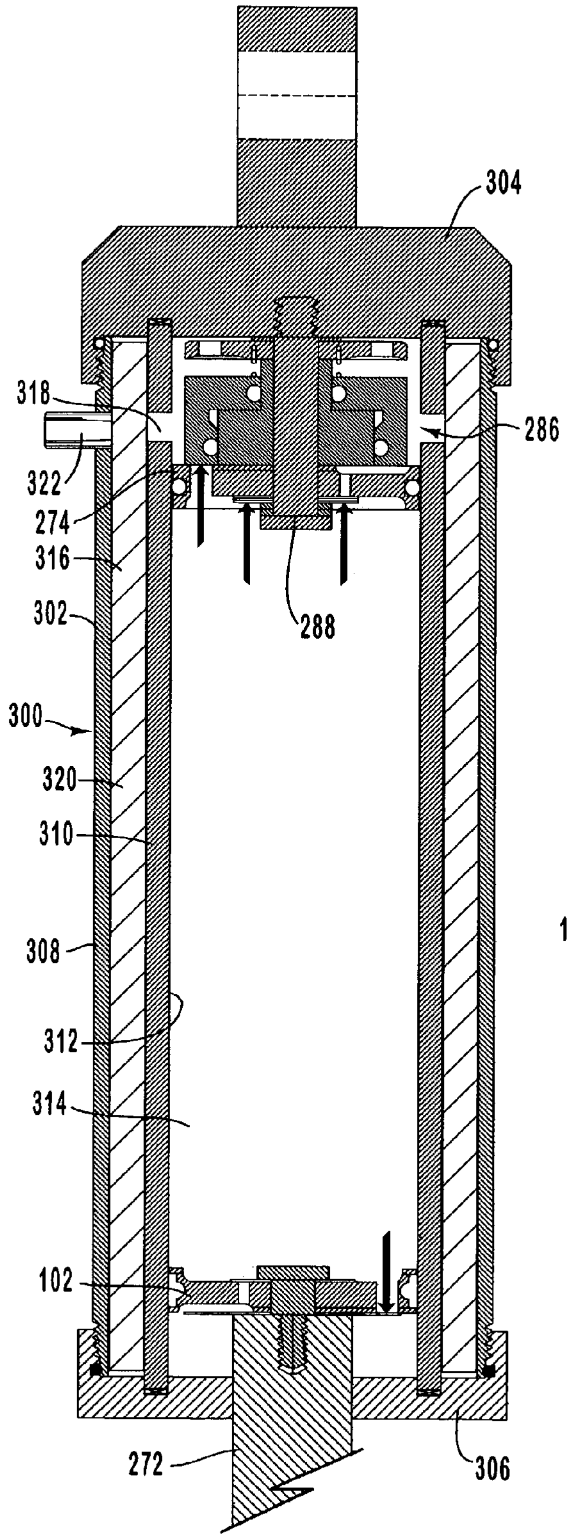
FIG. 19 is a cross sectional side view of a twin tube damper.

Depicted in FIG. 19 is another alternative embodiment of a damper 300. Damper 300 includes a double tube housing 302. Specifically, housing 302 comprises a distal cap 304 and an opposing proximal cap 306. Extending between caps 304 and 306 and secured thereto is an outer tube 308. Disposed within outer tube 308 is an inner tube 310 which also extends between opposing caps 304 and 306. Inner tube 310 has an interior surface 312 that bounds an inner compartment 314. Bounded between the exterior surface of inner tube 310 and the interior surface of outer tube 308 is an outer compartment 316. Inner compartment 314 communicates with outer compartment 316 through a port 318.

Inner compartment 314 is filled with a hydraulic fluid. Disposed within outer compartment 316 is an inflatable bladder 320. Bladder 320 is selectively inflated through a fill valve 322 projecting through outer tube 308. Disposed within the distal end of inner compartment 314 is base valve 286 as previously discussed with regard to damper 270 in FIGS. 15–18. In this embodiment, however, shaft 288 is used to secure base valve 286 directly to distal end cap 304. It is appreciated that alternative mounting methods can be used to secure base valve 286 within inner tube 310. Piston rod 272 with main piston 102, as also discussed with damper 270, are slideably disposed within inner compartment 314.

Figure 20:
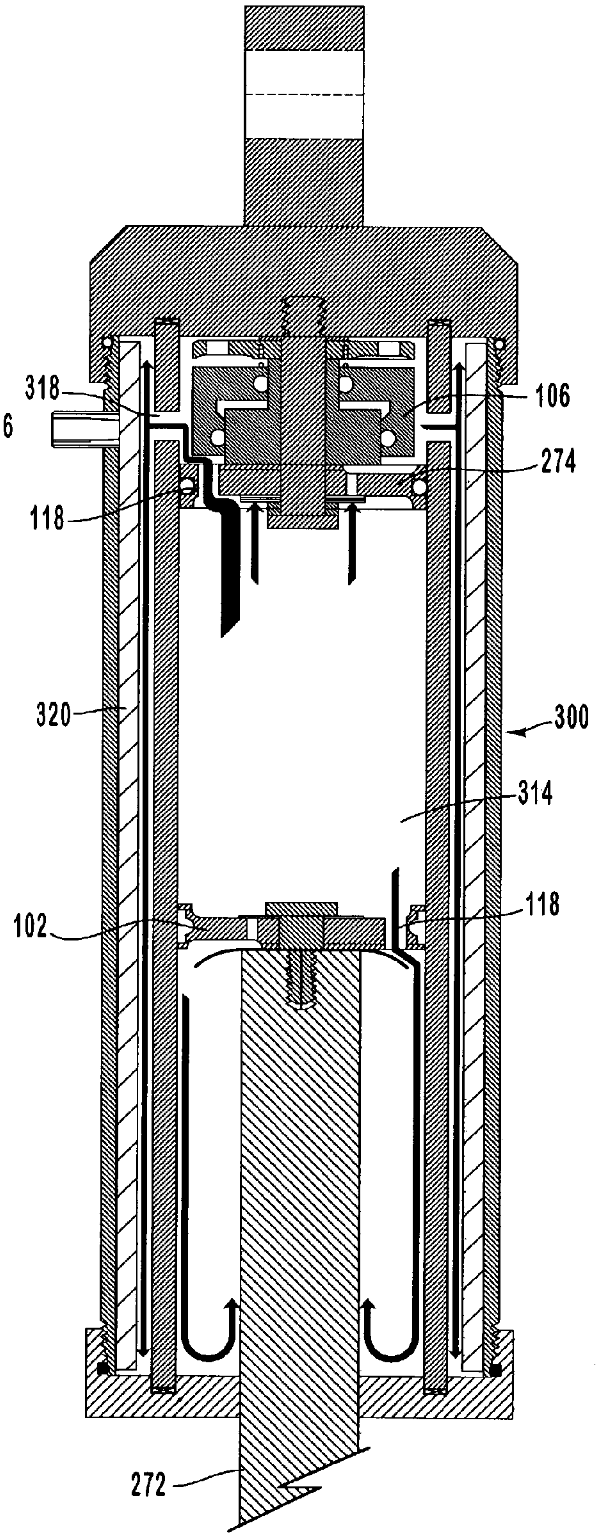
FIG. 20 is a cross sectional side view of the twin tube damper shown in FIG. 19 with the piston rod being advanced into the inner tube thereof.

As depicted in FIG. 20, damper 300 operates similar to damper 270. Specifically, as piston rod advances into inner compartment 314, control valve 106 moves to the open position and the hydraulic fluid travels through compression ports 118 on both main piston 102 and secondary piston 274. As the fluid passes secondary piston 274, the hydraulic fluid enters outer compartment 316 thorough port 318 where it compresses bladder 320. The hydraulic fluid continues to compress bladder 320 until piston rod 272 is retracted. During retraction, the hydraulic fluid flows back through main piston 102 and secondary piston 274 in substantially the same ways as previously discussed with regard to damper 270. In an alternative embodiment, it is appreciated that bladder 320 can be replaced with a floating piston which encircles inner tube 310 and slides within outer compartment 316. In yet another alternative, damper 320 can be inverted and bladder 320 removed. In this embodiment, a gas, such as air, is trapped within outer compartment 316. The hydraulic fluid directly contacts the gas, such as previously discussed with regard to FIG. 11, so as to selectively compress the gas.

Figure 21:
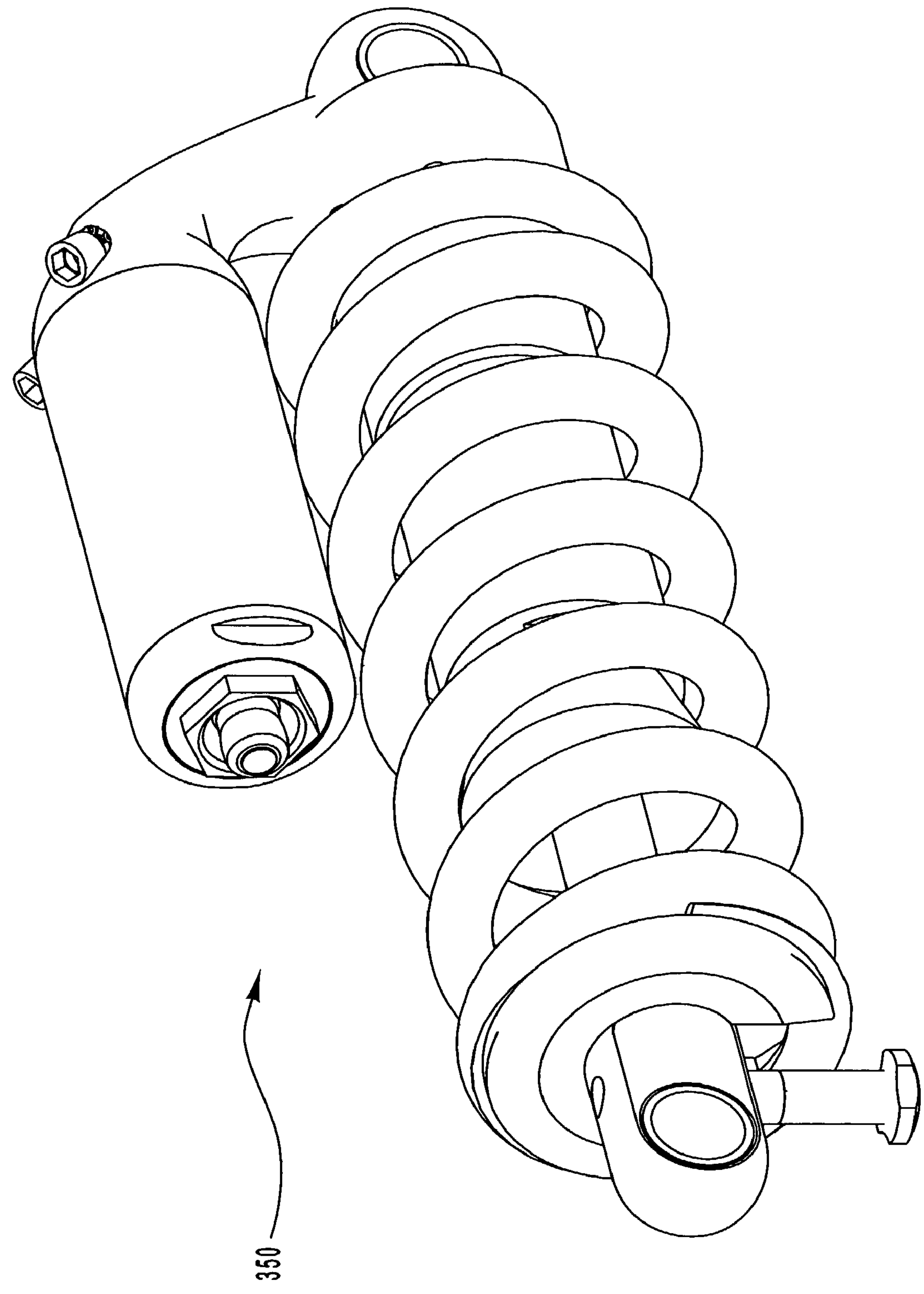
FIG. 21 is a perspective view of a shock absorber.
Figure 22:
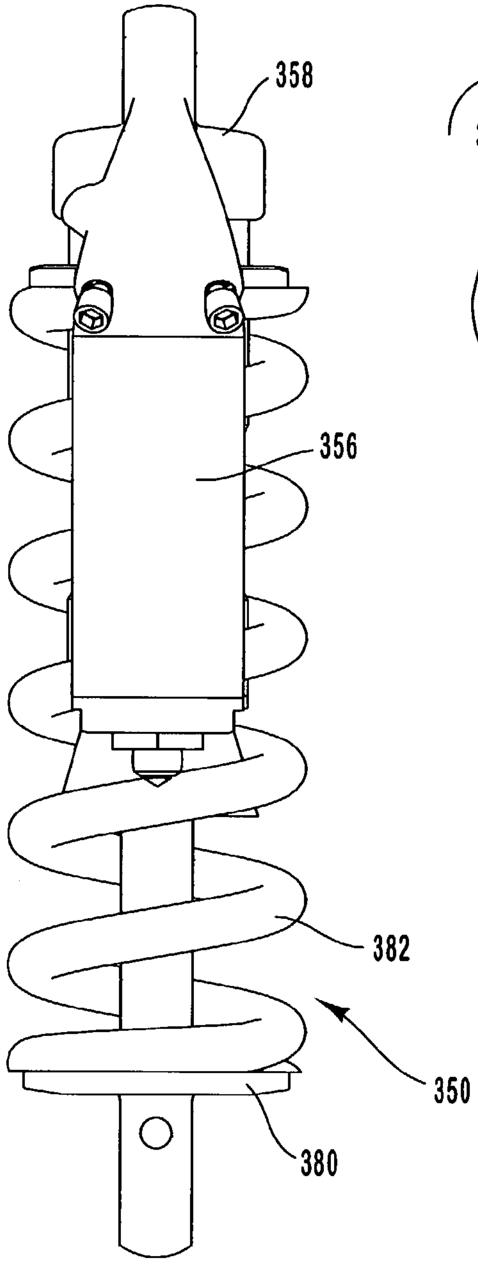
FIG. 22 is an elevated front view of the shock absorber shown in FIG. 21.
Figure 23:
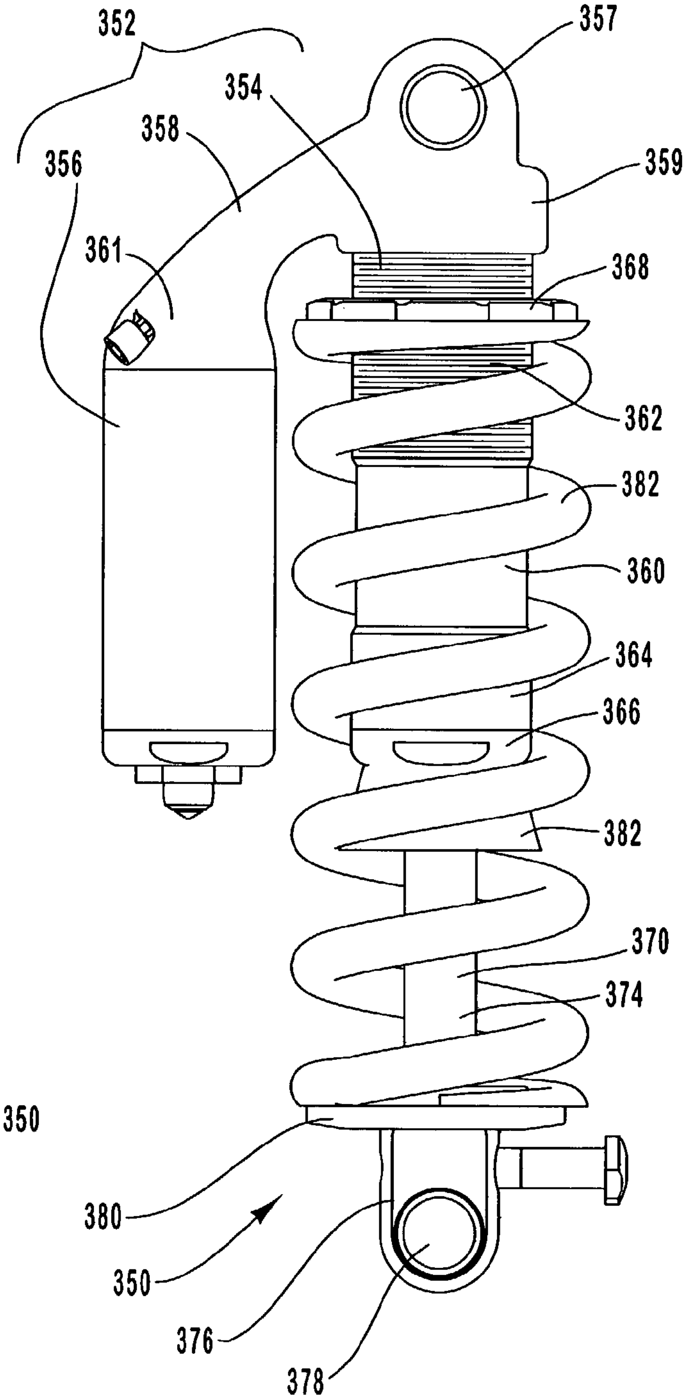
FIG. 23 is a an elevated side view of the shock absorber shown in FIG. 21.
Figure 24:
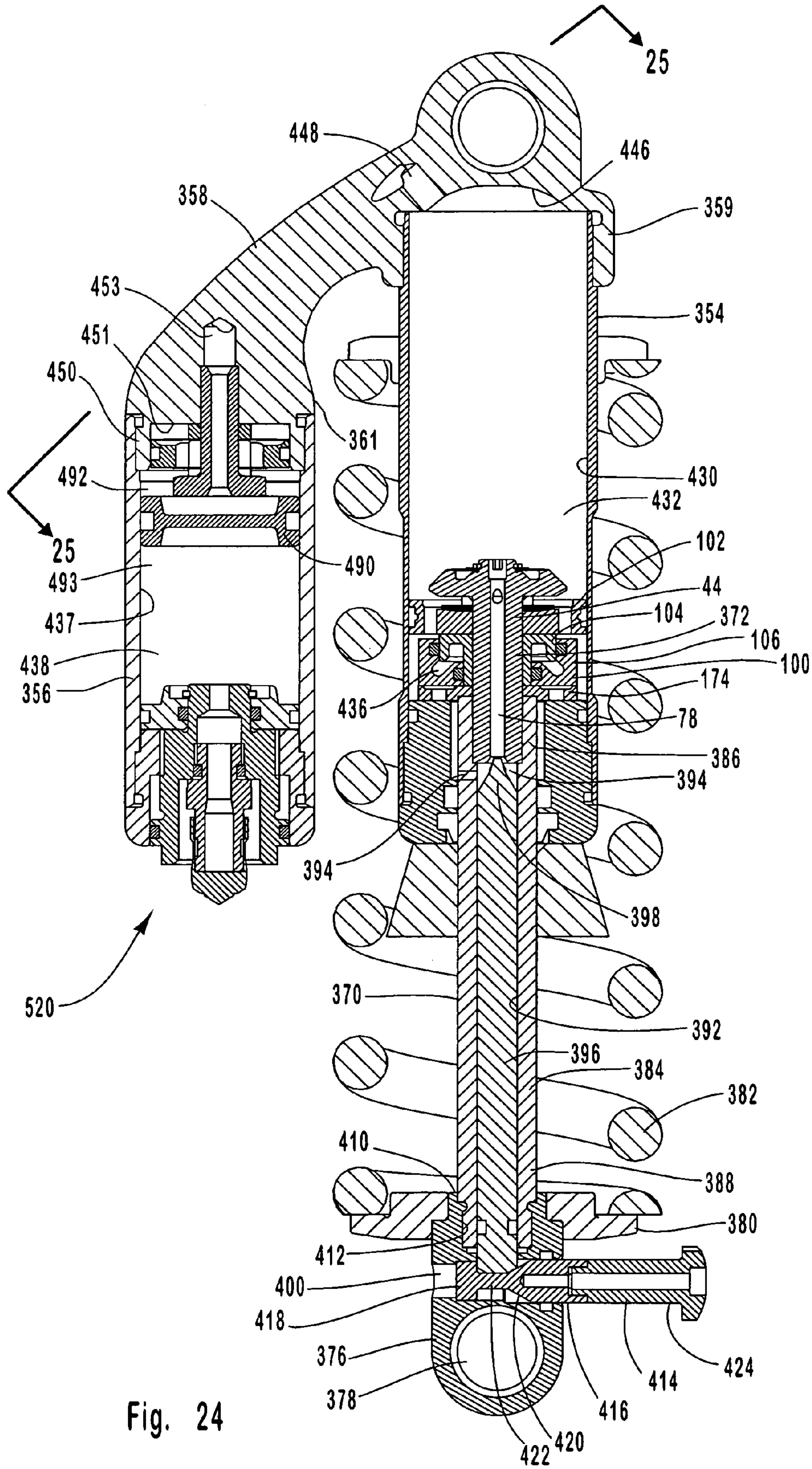
FIG. 24 is a cross sectional side view of the shock absorber shown in FIG. 21.

Depicted in FIG. 21 is one embodiment of shock absorber 350 incorporating features of the present invention. As depicted in FIGS. 22 and 23, shock absorber 350 comprises a piggy-back housing 352 which includes a primary tube 354, a secondary tube 356 and a stem 358 extending therebetween. As depicted in FIG. 24 primary tube 354 has an interior surface 430 bounding a primary chamber 432 while secondary tube 356 has an interior surface 437 bounding a secondary chamber 438. Returning to FIGS. 22 and 23, stem 358 has a substantially U-shaped configuration that extends between a first end 359 and an opposing second end 361. An opening 357 extends through stem 358 at first end 359 for selective attachment to a structure.

Primary tube 354 has an exterior surface 360 extending between a distal end 362 and an opposing proximal end 364. Distal end 362 of primary tube 354 is threaded into first end 359 of stem 358. A proximal end cap 366 is threaded into proximal end 364 of primary tube 360. Adjustably threaded onto distal end 362 of primary tube 360 is an annular distal spring retention collar 368.

A piston rod 370 has a distal end 372 (FIG. 24) and an opposing proximal end 374. A bracket 376 having an opening 378 extending therethrough is threaded onto proximal end 374 of piston rod 370. Positioned on bracket 376 is an annular proximal spring retention collar 380. A coiled spring 382 extends between distal spring retention collar 368 and proximal spring retention collar 380. The tension on spring 382 is selectively adjusted by adjusting distal spring retention collar 368 along the length of primary tube 354.

Encircling piston rod 370 between proximal end cap 366 and proximal spring retention collar 380 is a bottom-out cushion 382. Cushion 382 is made of a resiliently flexible material such as rubber or polymeric foam.

As depicted in FIG. 24, piston rod 370 includes a tubular base rod 384 and bolt 44 as previously discussed with regard to damper 10. Base rod 384 has an interior surface 390 bounding a channel 392 that longitudinally extends between a distal end 386 and an opposing proximal end 388. Bolt 44 is threaded onto distal end 386 of base rod 384 so that channel 78 of bolt 44 is in fluid communication with channel 392 of base rod 384. A port 394 extends through base rod 384 so as to provide fluid communication between primary chamber 432 of primary tube 354 and channel 78. A pin 396 is slideably disposed within channel 392 of base rod 384. Pin 396 has a tapered nose 398 disposed at the distal end thereof. Nose 398 is configured to complementary fit within the proximal opening of channel 78 of bolt 44. As a result, pin 396 can be used to selectively restrict or close off fluid communication between primary chamber 432 and channel 78 by advancing and retracting pin 396 within base rod 384.

Bracket 376 has a distal end face 410 having a bore 412 recessed thereon. A passageway 400 transversely extends across bracket 376 so as to intersect with bore 412. Bracket 376 is screwed onto base rod 384 such that pin 396 extends down through bore 412 and partially into passageway 400. A regulator 414 is adjustably disposed within passageway 400. Regulator 414 includes a shaft 416 having a distal portion 418 in threaded engagement within passageway 400 of bracket 376, a substantially frustuconical transition portion 420, and a substantially cylindrical central portion 422 formed therebetween. Regulator 414 also includes a selectively removable knob 424. Selective rotation of knob 424 advances and retracts regulator 414 within passageway 400. As regulator 414 is advanced within passageway 400, frustuconical transition portion 420 biases against the distal end of pin 396 causing pin 396 to advance toward bolt 44, thereby restricting or closing off the proximal opening to channel 78. In turn, as regulator 414 is retracted, pin 396 is lowered, thereby opening the flow path to channel 78. Alternative adjustment systems may also be used to move pin 396.

Mounted on the distal end of piston rod 370 is main piston 102, control valve assembly 100, and stop plate 174. These elements are substantially the same as previously discussed with regard to damper 10 and operate in the same manner. The only distinction is that control valve assembly 100 of the embodiment shown in FIG. 24 has a slightly different configured valve chamber 170. This is due to different grooves formed on valve guide 104 and control valve 106.

Formed at first end 359 of stem 358 is a threaded bore 446. Distal end 362 of primary tube 360 is threaded within bore 446. A threaded sleeve 450 projects from an end face 451 at second end 361 of stem 358. A threaded central bore 453 is formed on end face 451. The distal end of secondary tube 356 is coupled with threaded sleeve 450. Alternative attachment methods may also be used to secure primary tube 360 and secondary tube 356 to piggy back housing 352, including use of a 1-piece forged or cast assembly which includes all of the aforementioned parts.

Figure 25:
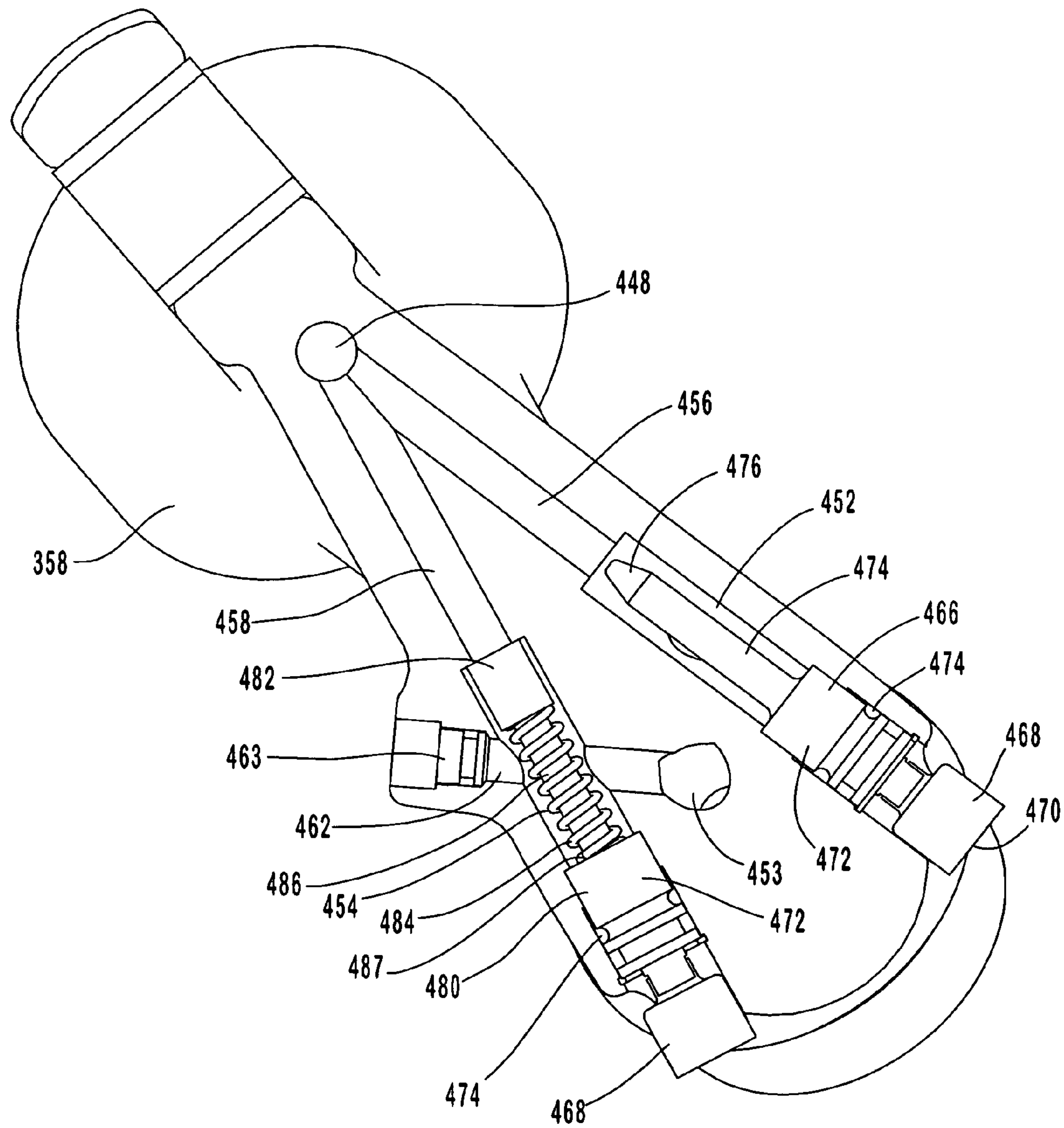
FIG. 25 is a cross sectional view of the shock absorber shown in FIG. 24 taken along section lines 25—25.

Stem 358 is configured to provide fluid communication between primary chamber 432 of primary tube 360 and secondary chamber 438 of secondary tube 356. Specifically, a transition channel 448 communicates with bore 446 at first end 359 of stem 358. As depicted in FIG. 25, a first valve chamber 452 and a second valve chamber 454 are each bored into stem 358 from second end 361 toward first end 359. A first pathway 456 extends from first valve chamber 452 to transition channel 448 while a second pathway 458 extends from second valve chamber 454 to transition channel 448. A bore 460 intersects with first valve chamber 452 and extends to end face 451 at second end 361 of stem 358. A bore 462 transversely intersects with both second valve chamber 454 and central bore 453 so as to provide fluid communication therebetween. A plug 463 is secured in the opening of bore 462 to prevent fluid from escaping thereat.

A first valve 466 is adjustably disposed within first valve chamber 452. First valve 466 comprises a head 468 having a socket 470 formed on the end thereof to selectively receive a tool for rotating first valve 466. First valve 466 also has a central body 472 having threads thereon that engage with the inner wall of first valve chamber 452. One or more seals 474 encircle body 472 and provide sealed engagement with the inner wall of first valve chamber 452. Projecting from body 472 is a shaft 474 having a tapered nose 476. Tapered nose 476 is configured to selectively engage with the opening to first pathway 456. Accordingly, by selectively rotating first valve 466, shaft 474 advances or retracts so as to selectively restrict or open the opening to first pathway 456.

A second valve 480 is adjustably disposed within second valve chamber 454. Similar to first valve 466, second valve 480 comprises head 468, threaded body 472, and seal 474. A piston 482 is movably disposed within second valve chamber 454 at the opening to second pathway 458. A spring 484 extends between body 472 and piston 482 so as to bias piston 482 against the opening to second pathway 458. A rod 486 extends from piston 482, centrally through spring 484, and freely into a channel 487 formed in the end of body 472. As piston 482 is pushed back, rod 486 is free to retract within body 472.

By advancing second valve 480 within second valve chamber 454, spring 484 is compressed, thereby providing greater biasing force against piston 482. Second pathway 458 is thus only open when sufficient force is applied to piston 482 to overcome the applied spring force. Accordingly, by selectively adjusting first valve 466 and second valve 480, dampening properties can be adjusted for operating conditions.

Returning to FIG. 24, movably disposed within secondary chamber 438 is a floating piston 490. Floating piston 490 divides the enclosed area bounded by primary tube 354, secondary tube 356 and stem 358 into a proximal compartment 492 and a distal compartment 493. Again, proximal compartment 492 is filled with a hydraulic fluid while distal compartment 493 is filled with a compressible gas. Other alternatives as previously discussed can also be used to replace or use in conjunction with floating valve 490 and the compressible gas.

Figure 26:
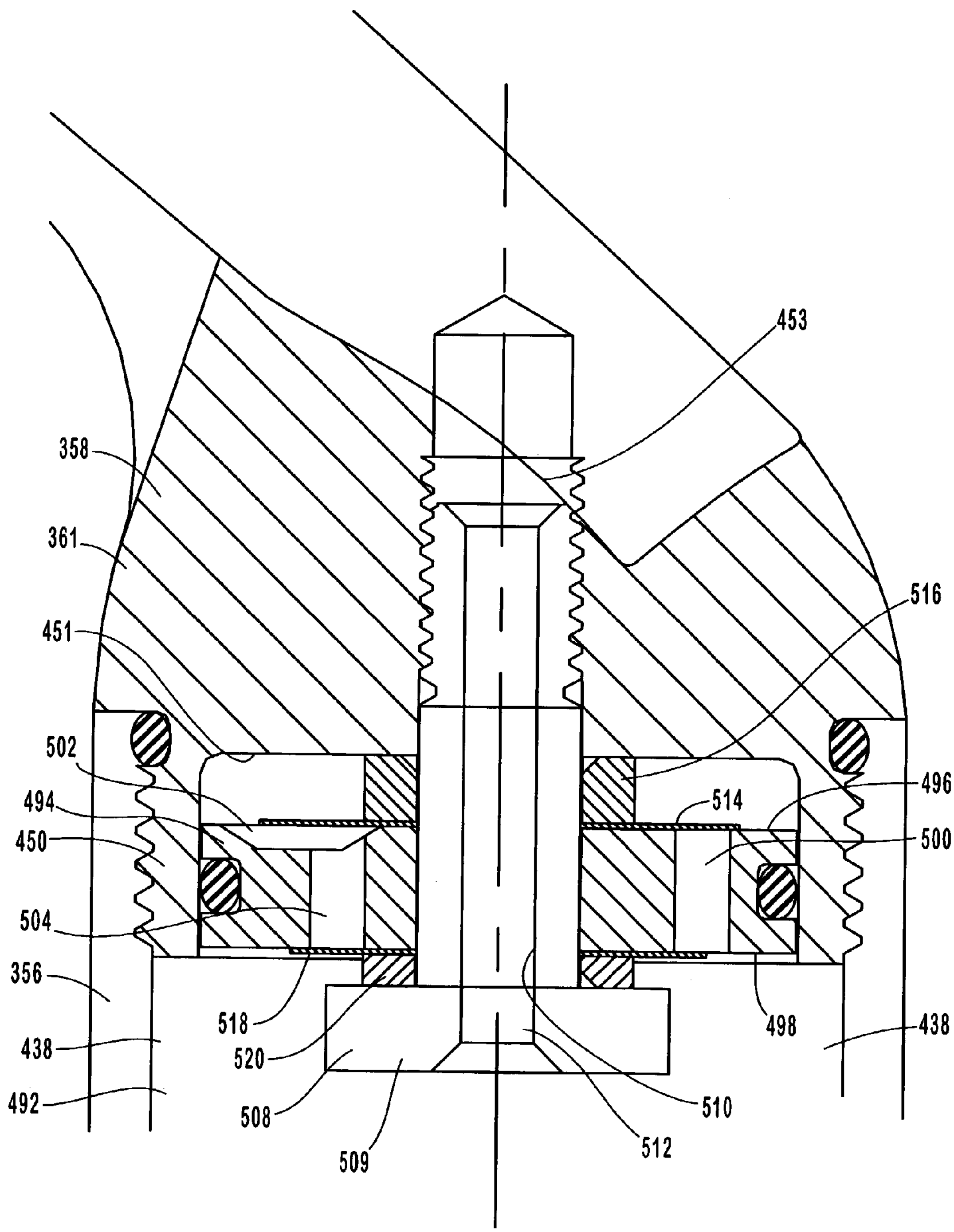
FIG. 26 is an enlarged cross sectional side view of the second end of the stem of the shock absorber shown in FIG. 24.

Turning to FIG. 26, a tubular bolt 508 having an enlarged head 509 is threaded into central opening 453 at second end 361 of stem 358. Tubular bolt 508 has an interior surface 510 bounding a channel 512. Central opening 453 and channel 512 provide fluid communication between second valve chamber 454 and secondary chamber 438. Alternative attachment methods may be used in place of bolt 508.

Encircling bolt 508 and biased against the interior surface of sleeve 450 is a fixed piston 494 having a configuration similar to piston 102 as discussed with damper 10. Fixed piston 494 has a proximal face 496 and an opposing distal face 498. Extending between faces 496 and 498 are a plurality of radially spaced apart damping ports 500. A plurality of radially spaced apart pockets 502 are recessed on proximal face 496. A compression port 504 extends from distal face 498 to each pocket 502.

A first shim 514 encircles bolt 508 and biases against proximal face 496. First shim 514 covers the proximal opening of damping ports 500 but only covers a portion of pockets 502. A washer 516 encircles bolt 508 and is disposed between shim 514 and end face 451 of stem 358. Washer 516 provides spacing between end face 451 and first shim 514 so that first shim 514 can flex proximal during operation.

A second shim 518 encircles bolt 508 and biases against distal face 498 of fixed piston 494. Second shim 518 covers the distal opening of compression ports 504 but only covers a portion of the distal openings of damping ports 500. A washer 520 is disposed between bolt head 509 and second shim 518 to enable second shim 518 to flex distally during operation. As previously mentioned, bore 460 extends between first valve chamber and end face 451 of stem 358. As such, the hydraulic fluid passing through bore 460 must necessarily pass through fixed piston 494 as it enters secondary chamber 438.

Figure 27:
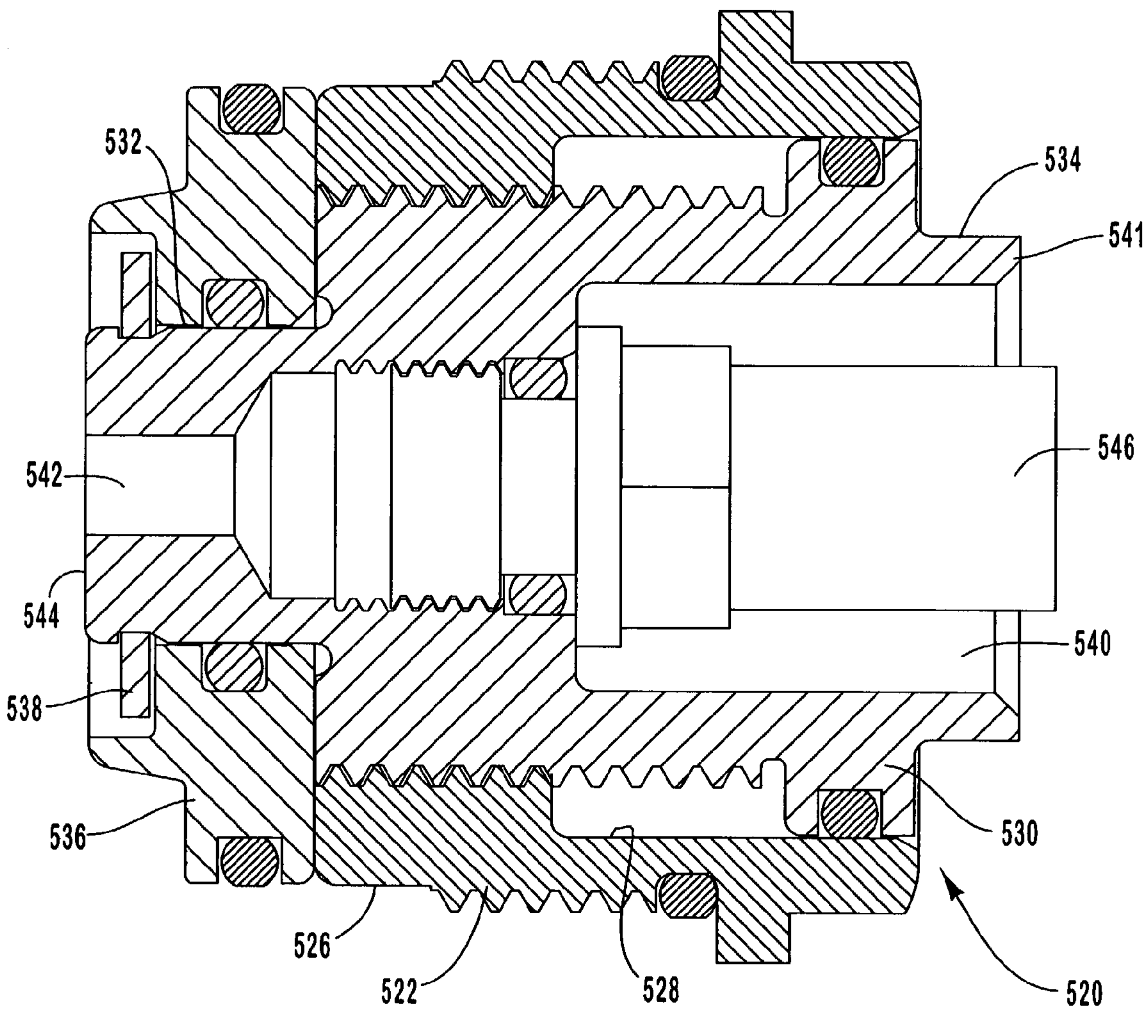
FIG. 27 is an enlarged cross sectional side view of the gas volume adjuster assembly of the shock absorber shown in FIG. 24.

Depicted in FIG. 24, threaded into the distal end of secondary tube 356 is a volume adjuster assembly 520. Depicted in FIG. 27, volume adjuster assembly 520 comprises an annular sleeve 522 having an interior surface 528 and an exterior surface 526. Sleeve 522 is threaded into the distal end of secondary tube 356. Adjustably threaded into sleeve 522 is a tubular stem 530. Stem 530 has a proximal end 532 and a distal end 534. Mounted on proximal end 532 of stem 530 so as to encircle and radially outwardly project therefrom is a piston 536. Piston 536 is secured to stem 530 by a clip 538 mounted on stem 530 proximal of piston 536. Piston 536 outwardly projects so as to seal in slideable engagement against interior surface 437 of secondary tube 356. Distal compartment 493 is bounded between floating piston 490 and piston 536. By selectively rotating stem 530 relative to sleeve 522, stem 530 and thus piston 536 advance or retract relative to sleeve 522. Thus by advancing stem 530 and piston 536, distal compartment 493 becomes smaller. In turn the rate at which the gas compresses, i.e., the compression ratio, within distal compartment 493 increases.

A cavity 540 is recessed on a distal end face 541 of stem 530. A passageway 542 extends from cavity 540 to a proximal end face 544 of stem 530. Positioned within cavity 540 in communication with passageway 542 is a fill valve 546 through which pressured gas can be fed into distal compartment 493. One example of valve 546 is a Schrader charge valve. Thus, fill valve 546 can be used to selectively adjust the gas pressure within distal compartment 493, thereby adjusting the related dampening properties.

It is appreciated that shock absorber 350 operates using the same principals as discussed in detail with regard to the other embodiments.

Figure 28:
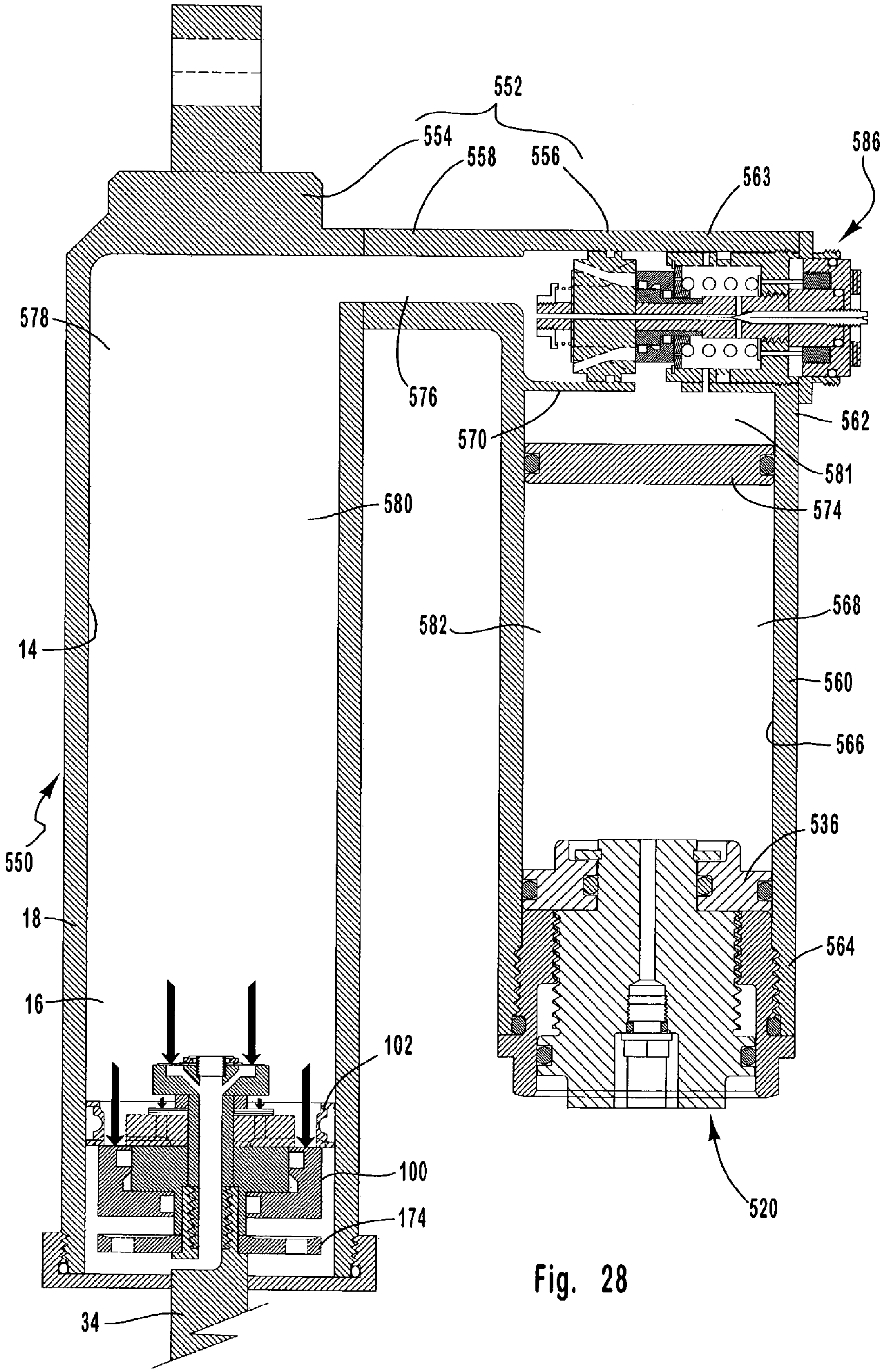
FIG. 28 is a cross sectional side view of an alternative embodiment of a damper having a base valve assembly.

Depicted in FIG. 28 is another alternative embodiment of a damper 550. Damper 550 has a piggy-back housing 552 comprising a primary housing 554, a secondary housing 556, and a tubular stem 558 extending therebetween. A sealed hose, pipe, or other conduit may be substituted for stem 558 for establishing fluid communication between primary housing 554 and secondary housing 556. Primary housing 554 is the same as housing 12 previously discussed with regard to damper 10 except for the attachment of stem 558. Furthermore, as also discussed with damper 10, coupled with primary housing 554 is piston rod 34 having a main piston 102, control valve assembly 100, and stop plate 174 mounted thereon. As such like elements between damper 550 and damper 10 are identified by like reference characters.

Secondary housing 556 comprises a tubular, cylindrical sidewall 560 extending between a proximal end 562 to an opposing distal end 564. Proximal end 562 terminates at a proximal end wall 563. Threadedly disposed within distal end 564 of secondary housing 556 is volume adjuster assembly 520 as previously discussed with regard to FIG. 25. Alternative methods for attaching volume adjustor assembly 520 can be used. Sidewall 560 has an interior surface 566 that bounds a secondary chamber 568 extending between proximal end wall 563 and piston 536 of volume adjuster assembly 520. Tubular stem 558 bounds a channel 576 that extends between primary chamber 16 and secondary chamber 568. Primary chamber 16, secondary chamber 568, and channel 576 of stem 558 combine to form a total chamber 578.

Inwardly projecting from sidewall 560 at distal end 562 of secondary housing 556 is a retaining wall 570. Slideably disposed within secondary chamber 568 distal of retaining wall 570 is a floating piston 574. Floating piston 574 divides total chamber 578 into a proximal compartment 580 and a distal compartment 582. Proximal compartment 580 is filled with a hydraulic fluid while distal compartment 582 is filled with a compressible gas.

Figure 29:
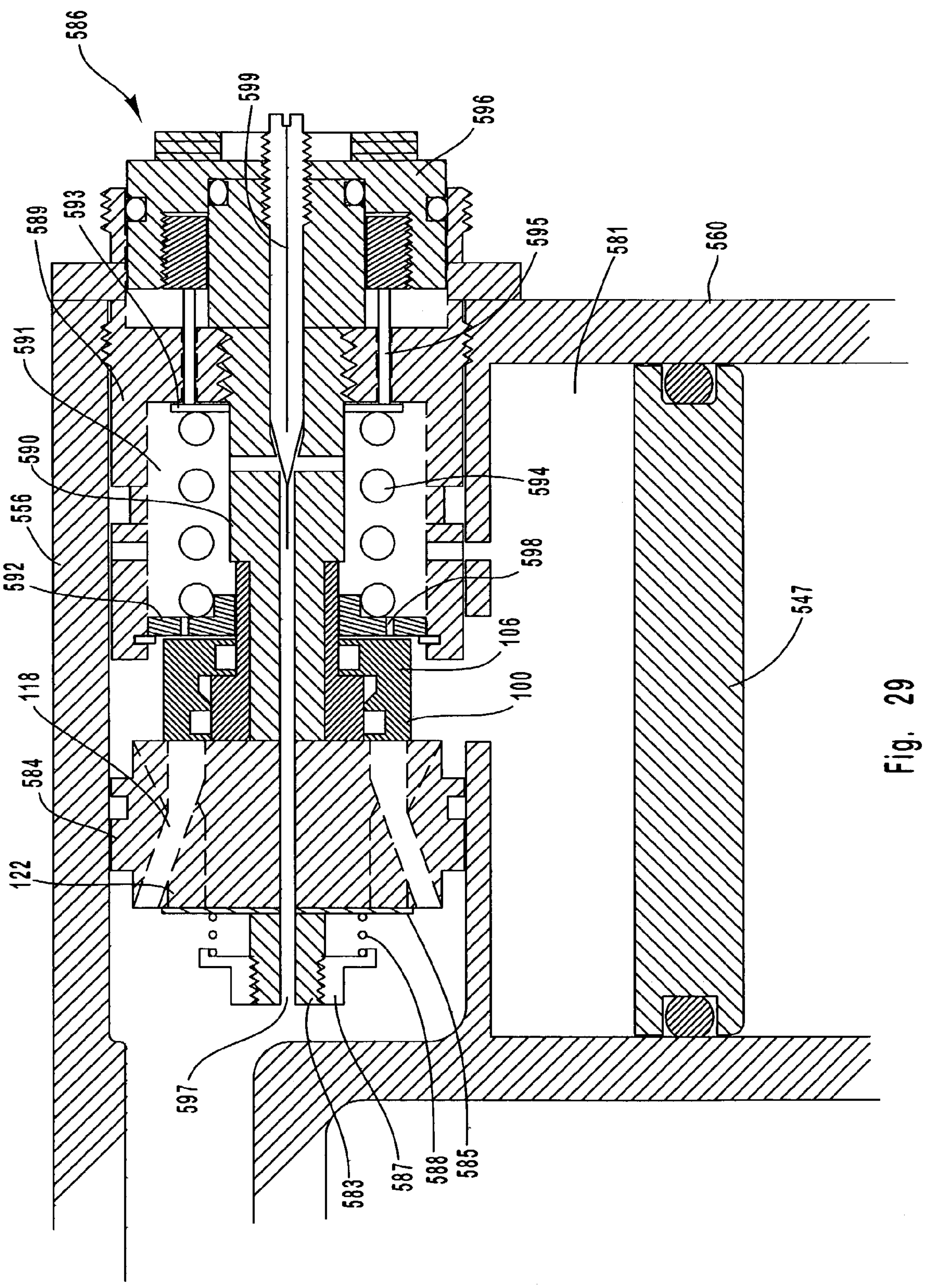
FIG. 29 is an enlarged cross sectional side view of the base valve assembly shown in FIG. 28.

Disposed between retaining wall 570 and proximal end wall 563 of secondary housing 556 is a base valve 586. Depicted in FIG. 29 is an enlarged cross sectional view of base valve 586. As depicted therein, base valve 586 comprises a secondary piston 584 having compression ports 118 and rebound ports 122 extending therethrough. A tubular shaft 583 extends through secondary piston 584 and beyond the proximal face thereof. A washer 585 encircles shaft 583 so as to cover the openings to rebound ports 122 while leaving the openings to compression ports 118 open. A retention collar 587 is threaded onto the proximal end of shaft 583. A spring 588 extends between retention collar 587 and washer 585 so as to bias washer 585 against the openings to rebound ports 583. Washer 585 and spring 588 function as a one-way check valve to regulate the fluid flow through rebound ports 122 and are an alternative embodiment to the flexible shims as discussed in other embodiments.

Disposed against the distal face of secondary piston 584 and encircling tubular shaft 583 is control valve 100. Control valve 100 controls the fluid flow through compression ports 118 in substantially the same method of operation as discussed in the other embodiments. That is, based on the force of the fluid passing through compression ports 118 and the pressure of the hydraulic pressure, control valve 100 is moved to some extent between the open position shown in FIG. 30 and the closed position shown in FIG. 31. Unlike the prior embodiments, however, control valve 100 can be selectively adjusted through the application of a spring force.

Specifically, a collar 589 is inserted within secondary housing 556. Collar 589 encircles tubular shaft 583 so that an annular spring cavity 591 is formed therebetween. Disposed within spring cavity 591 is an annular first bias plate 592 disposed against control valve 106 and an annular second bias plate 593 disposed against a portion of collar 589. A spring 594 extends between bias plates 592 and 593 so as to bias first bias plate 592 against control valve 106. Posts 595 extend from second bias plate 593 to an end cap 596. End cap 596 is configured such that rotation of end cap 596 causes posts 595 to advance into spring cavity 591, thereby further compressing spring 594. As spring 594 is compressed greater force is applied to control valve 106, thereby altering the operation thereof.

To enable the hydraulic fluid to access the distal side of control valve 100, a fluid path 597 extends through shaft 583 and communicates with spring cavity 591 and chamber 581. Ports 598 are formed on first bias plate 592 so as to enable the hydraulic fluid to directly contact control valve assembly 100. The hydraulic fluid thus assists in the opening and closing of control valve assembly 100 of base valve 586 based on the pressure of the hydraulic fluid. To selectively control the flow of hydraulic fluid into and out of spring cavity 591 and chamber 581, a pin 599 is threadedly disposed within fluid path 597 so as to selectively constrict fluid path 597.

Figure 30:
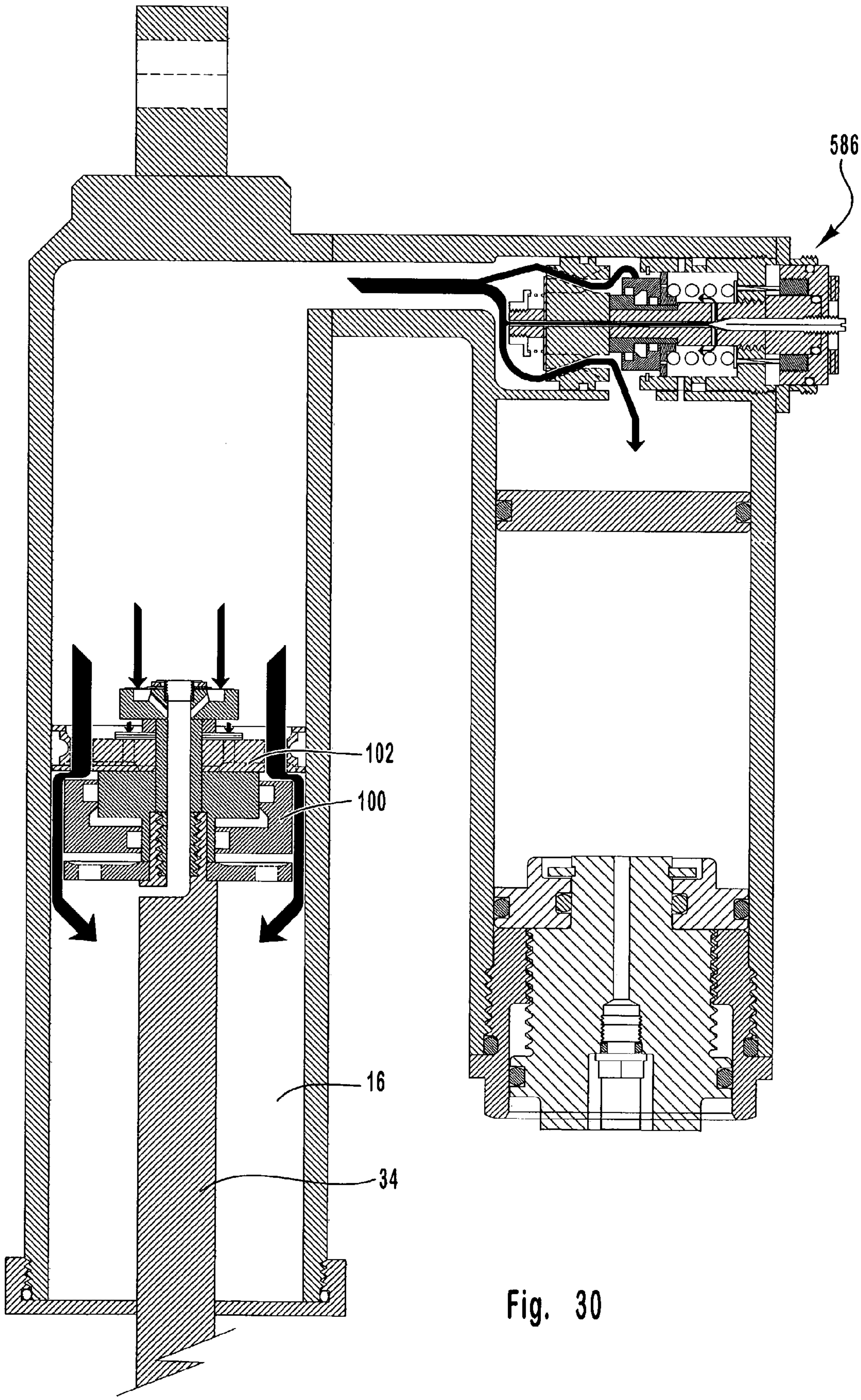
FIG. 30 is a cross sectional side view of the damper shown in FIG. 28 with the piston rod being advanced in the housing thereof.
Figure 31:
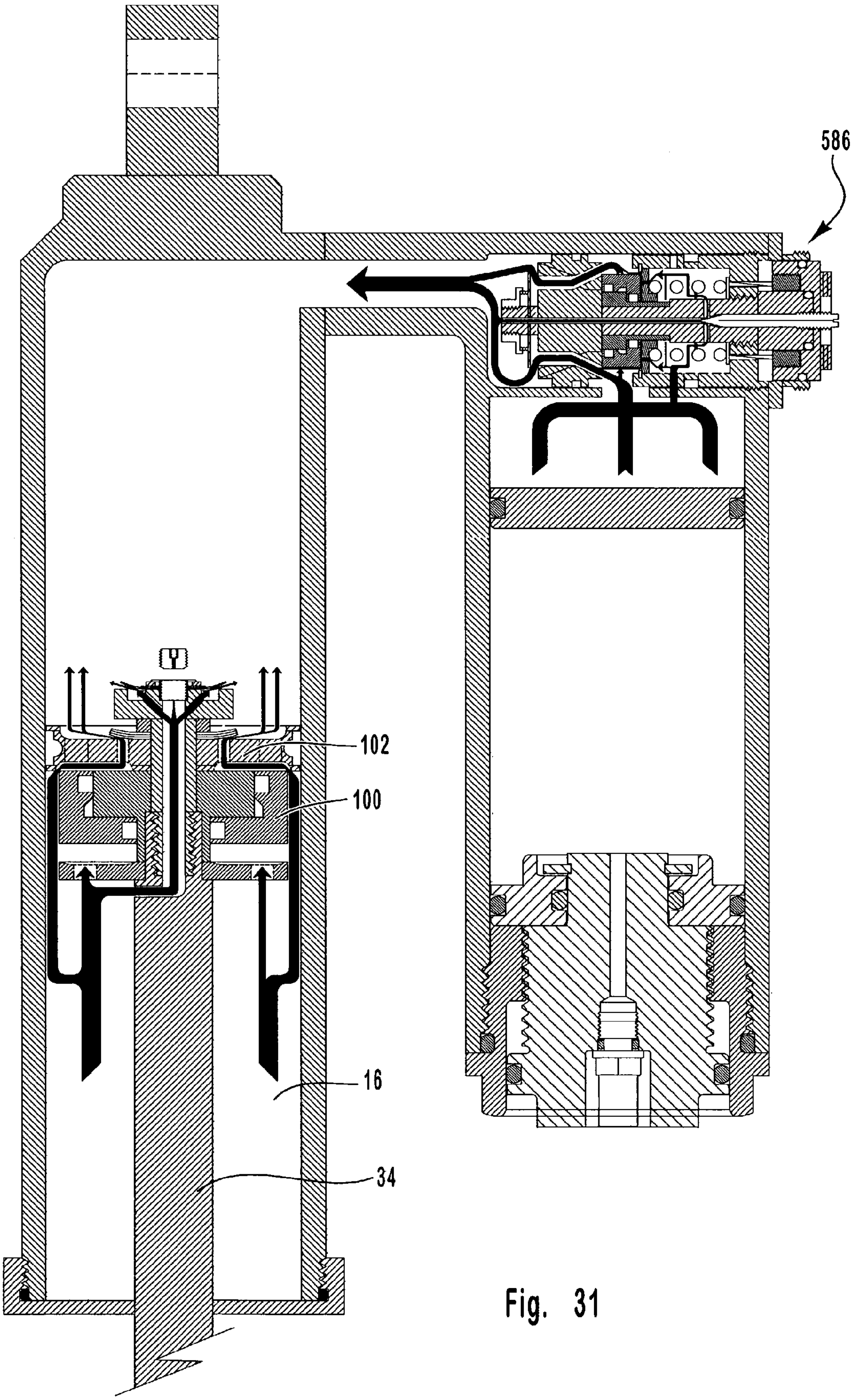
FIG. 31 is a cross sectional side view of the damper shown in FIG. 30 with the piston rod being retracted from the housing.

FIG. 30 shows the flow path of the hydraulic fluid as piston rod 34 is advanced within primary chamber 16. FIG. 31 shows the flow path of the hydraulic fluid as piston rod 34 is retracted out of primary chamber 16.

Figure 32:
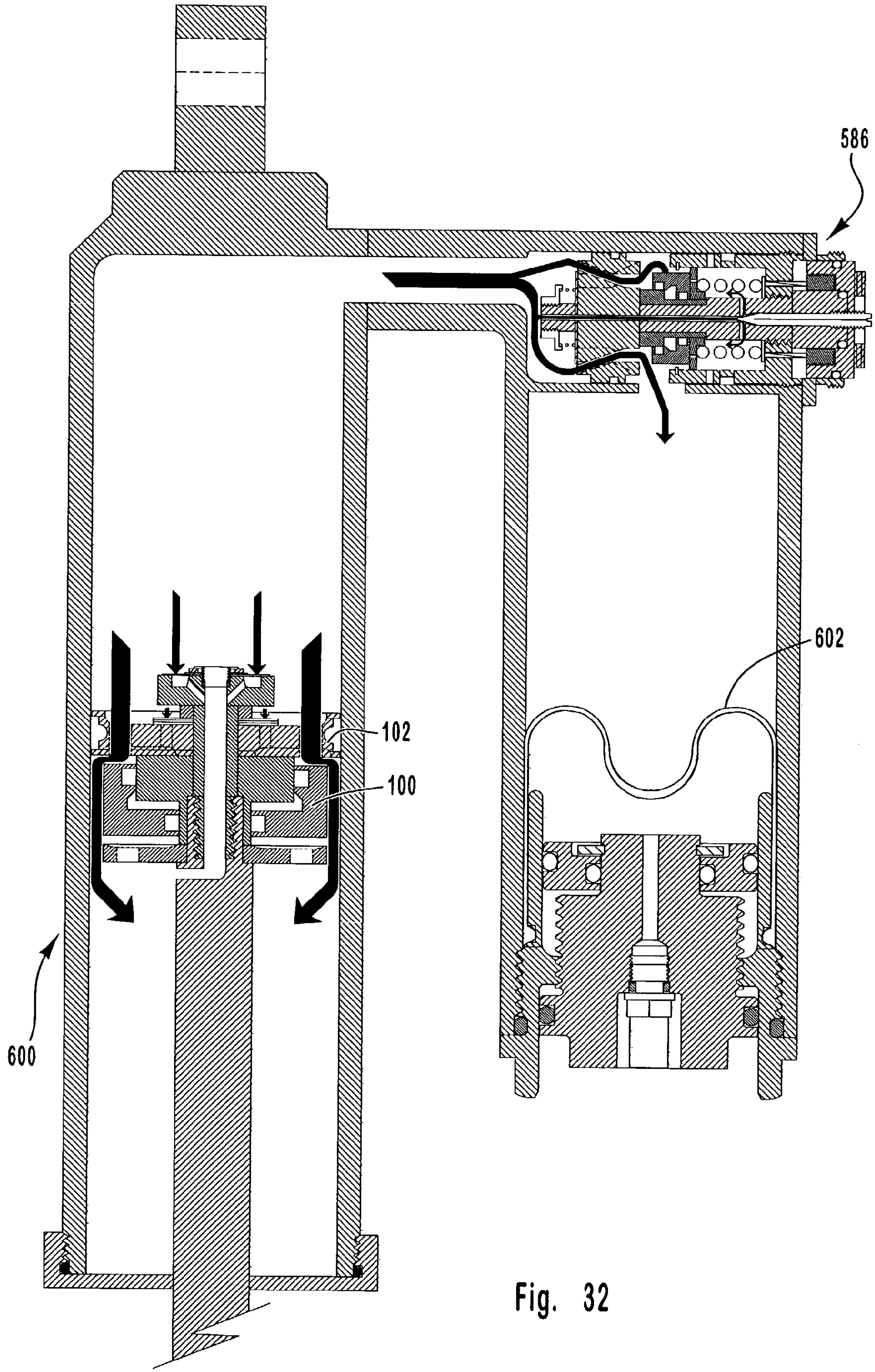
FIG. 32 is a cross sectional side view of an alternative embodiment of the damper shown in FIG. 28 with the floating piston being replaced by a flexible diaphragm.

Depicted in FIG. 32 is a damper 600 that is substantially identical to damper 550. Damper 600 is distinguished over damper 550 in that floating piston 574 has been replaced with a flexible diaphragm 602.

Figure 33:
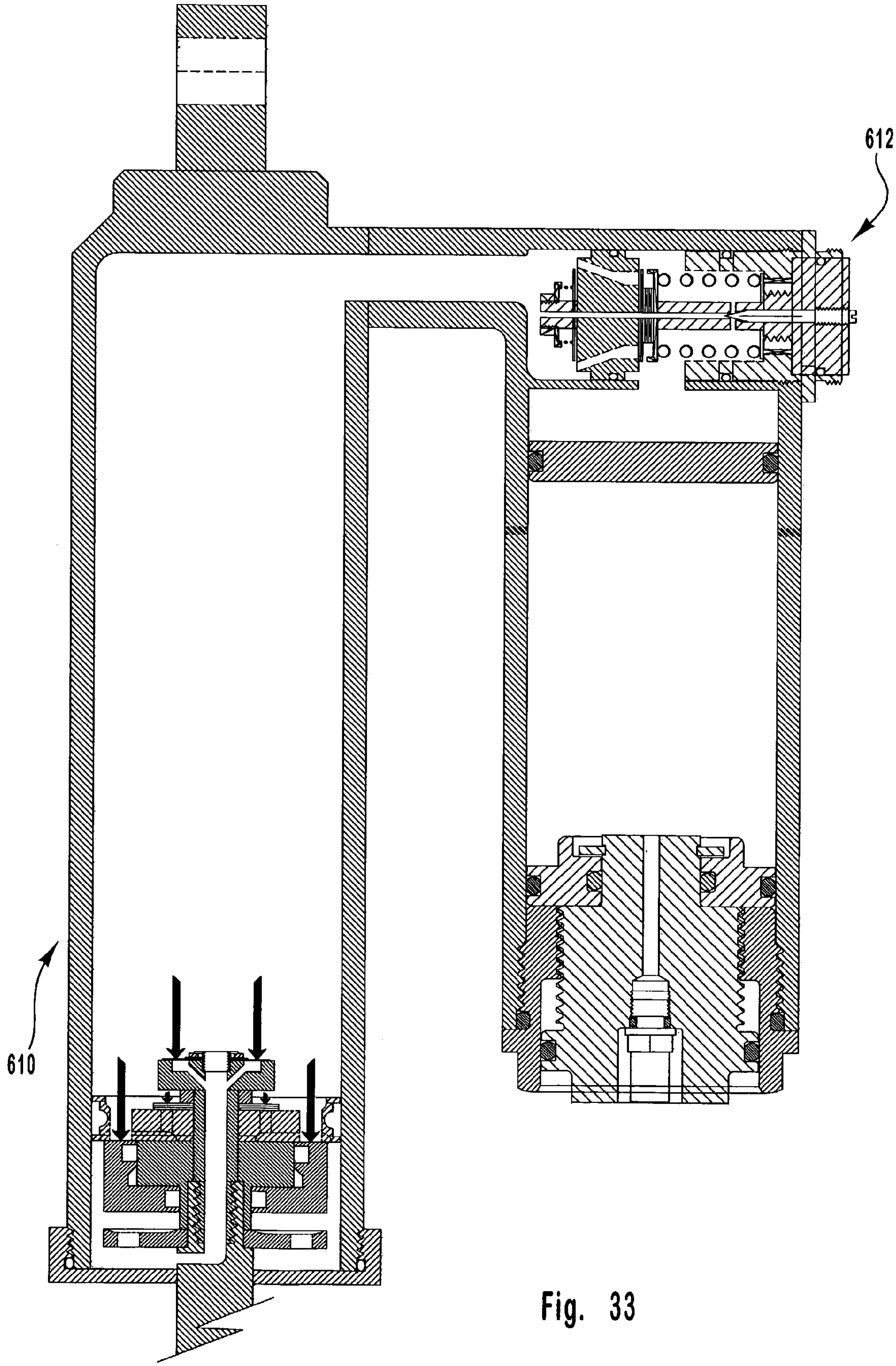
FIG. 33 is a cross sectional side view of an alternative embodiment of the damper shown in FIG. 28 with the base valve assembly being replaced by an alternative base valve assembly.

Depicted in FIG. 33 is another alternative embodiment of a damper 610 that is similar to damper 550. Damper 610 is distinguished over damper 550 in that base valve 586 which contains a control valve 100 has been replaced with a conventional base valve 612 that does not incorporate a control valve 100.

Figure 34:
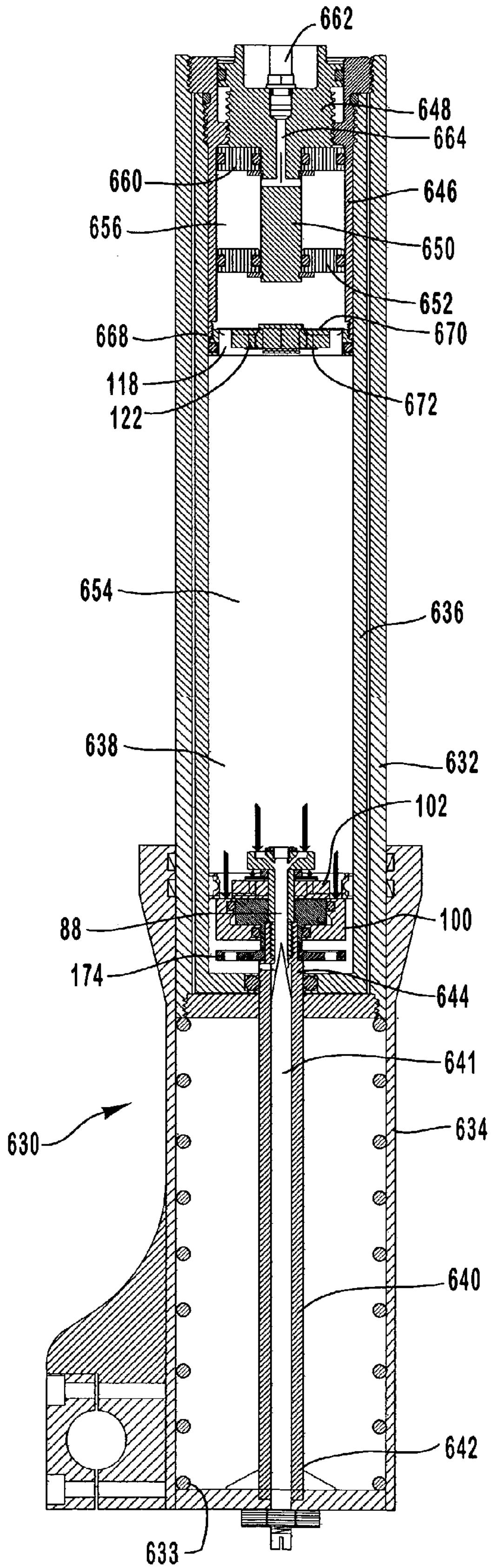
FIG. 34 is an elevated cross sectional side view of a front fork with a cartridge incorporating a damper of the present invention.
Figure 35:
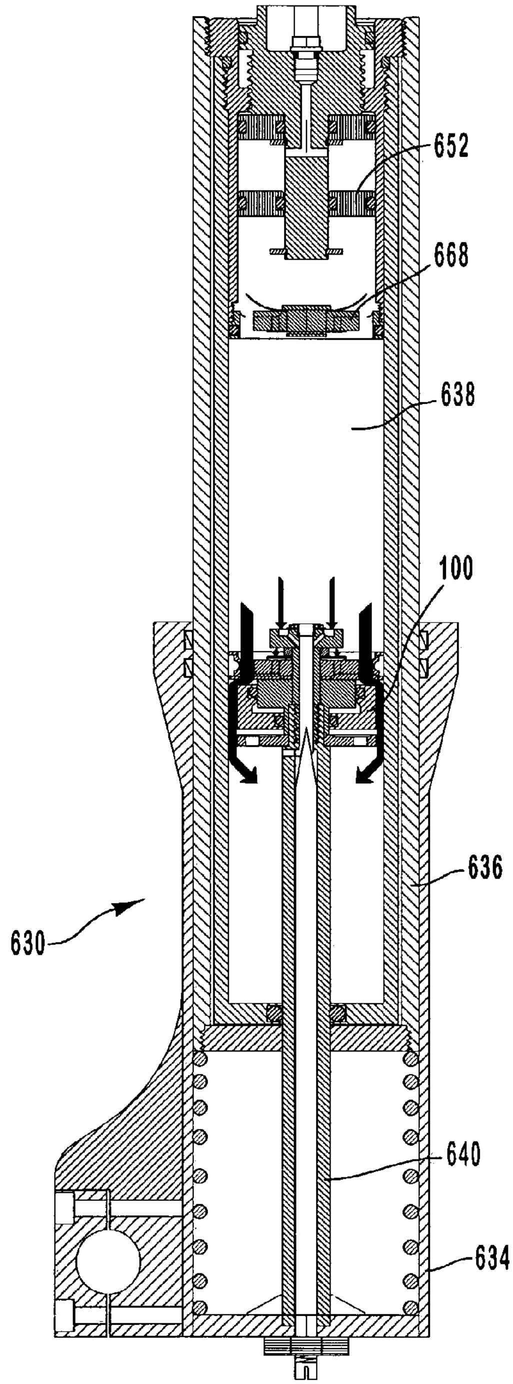
FIG. 35 is an elevated cross sectional side view of the front fork shown in FIG. 34 with the piston rod being advanced into the upper tube thereof.

Depicted in FIGS. 34 and 35 is one embodiment of how an inventive damper can be incorporated into a front fork of a bicycle, motorcycle, or the like. Specifically, depicted in FIG. 34 is a front fork 630 having an upper tube 632 slideably received within a lower tube 634. Disposed within lower tube 634 so as to resiliently bias against upper tube 632 is a spring 633. Spring 633 provides the rebound force for the damper and can be positioned at different locations. Alternative methods of producing a rebounding force may also be used, i.e., compressed gas, microcellular foam, and the like. Disposed within upper tube 632 is a tubular cartridge 636 which bounds a chamber 638. A tubular piston rod 640 has a proximal end 642 mounted on a base floor of lower tube 634 and an opposing distal end 644 slideably extending up through upper tube 632 and cartridge 636. Mounted within chamber 638 on distal end 644 of piston rod 640 is main piston 102, control valve 100, and stop plate 174 as previously discussed with regard to damper 10 in FIGS. 1–7.

Rebound channel 88, as disclosed with regard to damper 10, is also formed on piston rod 640 so as to extend between opposing sides of main piston 102. In contrast to rebound channel 88 for damper 10, however, in the embodiment depicted in FIG. 34 a regulating pin 641 having a tapered nose is movably disposed within piston rod 640. That is, by selectively rotating regulating pin 641 outside of lower tube 634, pin 641 can be adjusted to selectively restrict the flow of hydraulic fluid through rebound channel 88. In part, the slower the flow of hydraulic fluid through rebound channel 88, the slower the rebound of piston rod 640.

Screwed into the distal end of cartridge 636 is a hollow sleeve 646. In turn, screwed into sleeve 646 is an end plug 648 having a stem 650 proximally projecting therefrom within chamber 638. A first piston 652 encircles and is slideably disposed on stem 650. First piston 652 forms a sealed engagement with stem 650 and cartridge 636. As such, first piston 652 forms a barrier that divides chamber 638 into a relative proximal chamber 654 and a relative distal chamber 656. Proximal chamber 654 is filled with a hydraulic fluid while distal chamber 656 is filled with a compressible gas such as air.

Mounted against end plug 648 so as to also encircle stem 650 is a second piston 660. Second piston 660 is also in sealed engagement with stem 650 and cartridge 636. By rotating end plug 648, second piston 660 advances into distal chamber 656 effectively decreasing the size of distal chamber 656. This also increases the pressure within both proximal chamber 654 and distal chamber 656 and the compression ratio within distal chamber 656.

A fill valve 662 is mounted on end plug 648. A passageway 664 extends through end plug 648 from fill valve 662 to distal chamber 656. As such, fill valve 662 can be used to selectively adjust the volume and pressure of gas within distal chamber 656.

Finally, although not required, a base valve piston 668 is rigidly disposed within proximal chamber 654 between first piston 652 and piston rod 640. Base valve piston 668 is sealed against cartridge 636 and, except for having a solid center, has substantially the same configuration as main piston 102. Specifically, base valve piston 668 has compression ports 118 and rebound ports 122 extending therethrough. Flexible shims 670 and 672 are mounted on opposing sides of base valve piston 668, as previously discussed in other embodiments, to control the flow of hydraulic fluid through compression ports 118 and rebound ports 122, respectively. Base valve piston 668 thus further controls the flow of hydraulic fluid and transfer of pressure which partially controls the damping properties.

FIG. 35 shows front fork 630 with piston rod 640 being advanced into chamber 638.

Figure 36:
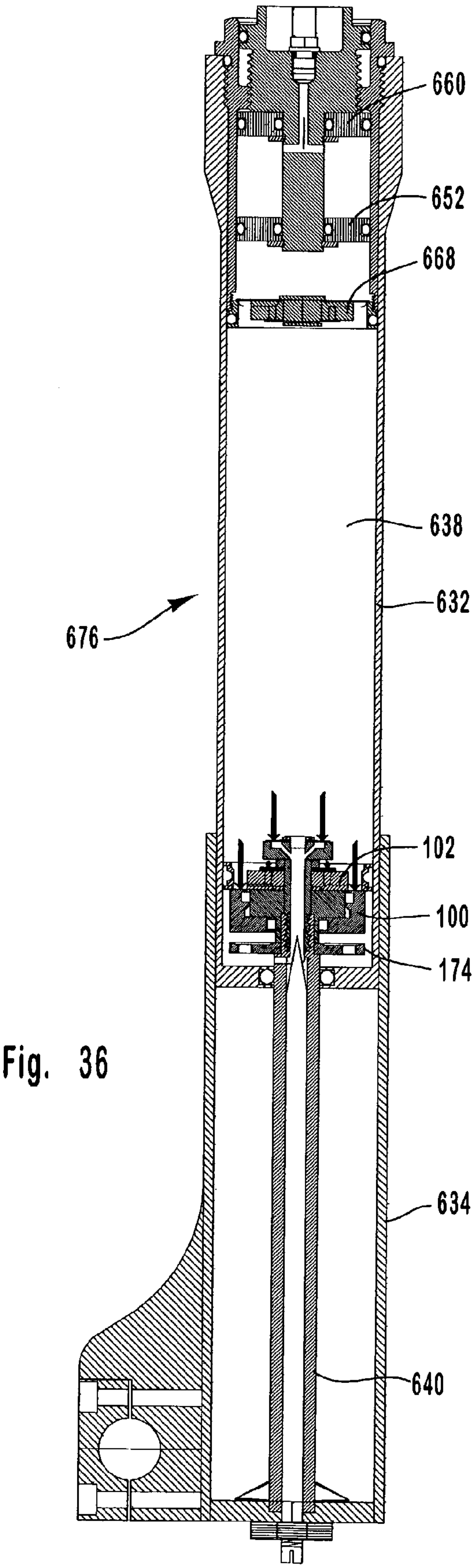
FIG. 36 is an elevated cross sectional side view of the front fork shown in FIG. 34 with the cartridge removed.
Figure 37:
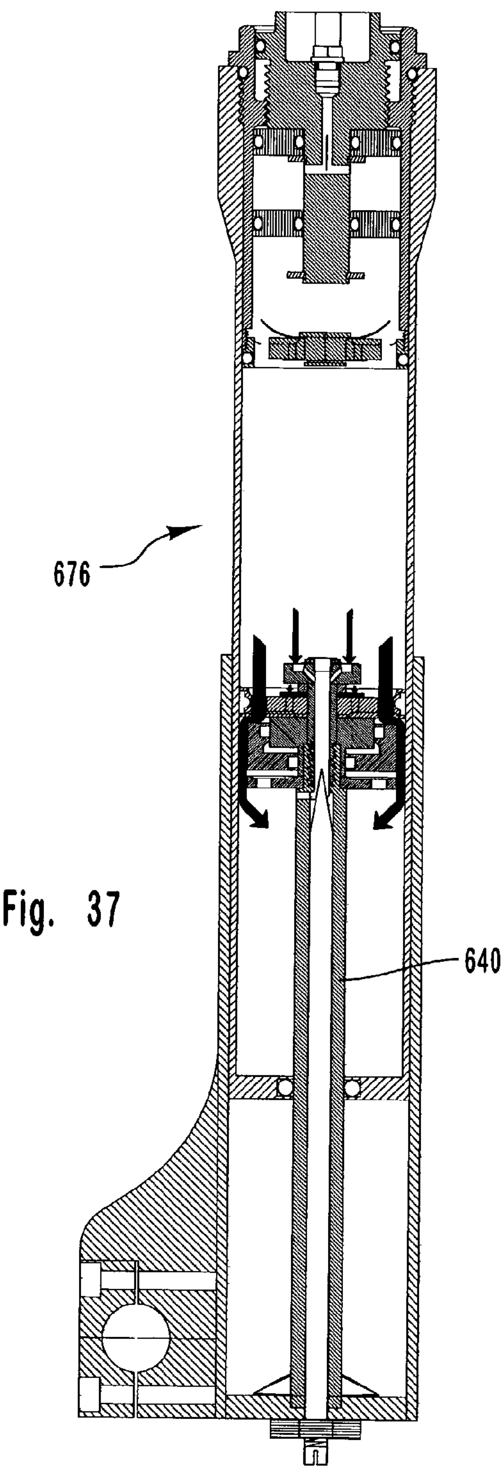
FIG. 37 is an elevated cross sectional side view of the front fork shown in FIG. 36 with the piston rod being advanced into the upper tube thereof.
Figure 38:
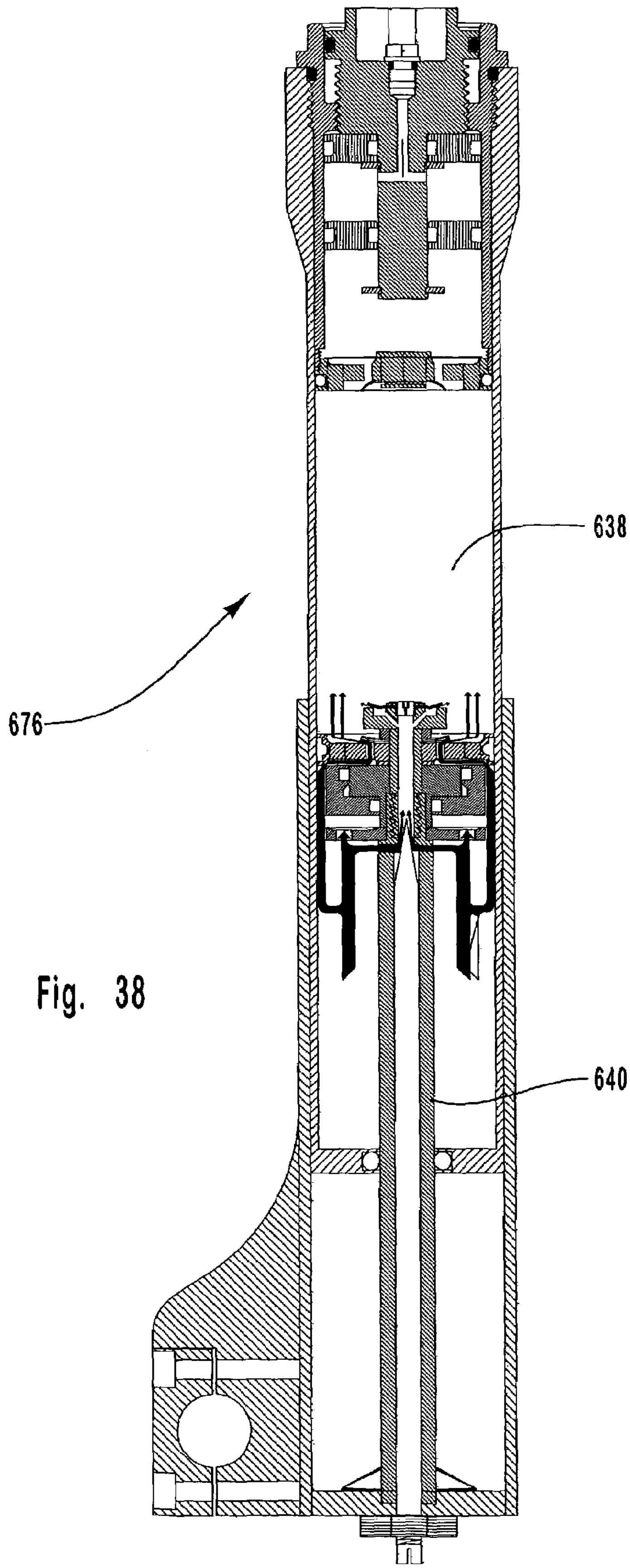
FIG. 38 is an elevated cross sectional side view of the front fork shown in FIG. 36 with the piston rod being retracted from the upper tube thereof.

The use of cartridge 636 as discussed above with regard to front fork 630 is for ease in manufacture and assembly. The use of cartridge 636 also enables the dampers of the present invention to be retrofit into existing forks. Depicted in FIG. 36, however, is a front fork 676. Front fork 676 is the same as front fork 630 except that cartridge 636 has been removed. FIG. 37 shows front fork 676 with piston rod 640 being advanced into chamber 638 while FIG. 38 shows front fork 676 with piston rod 640 being withdrawn from chamber 638.

Figure 39:
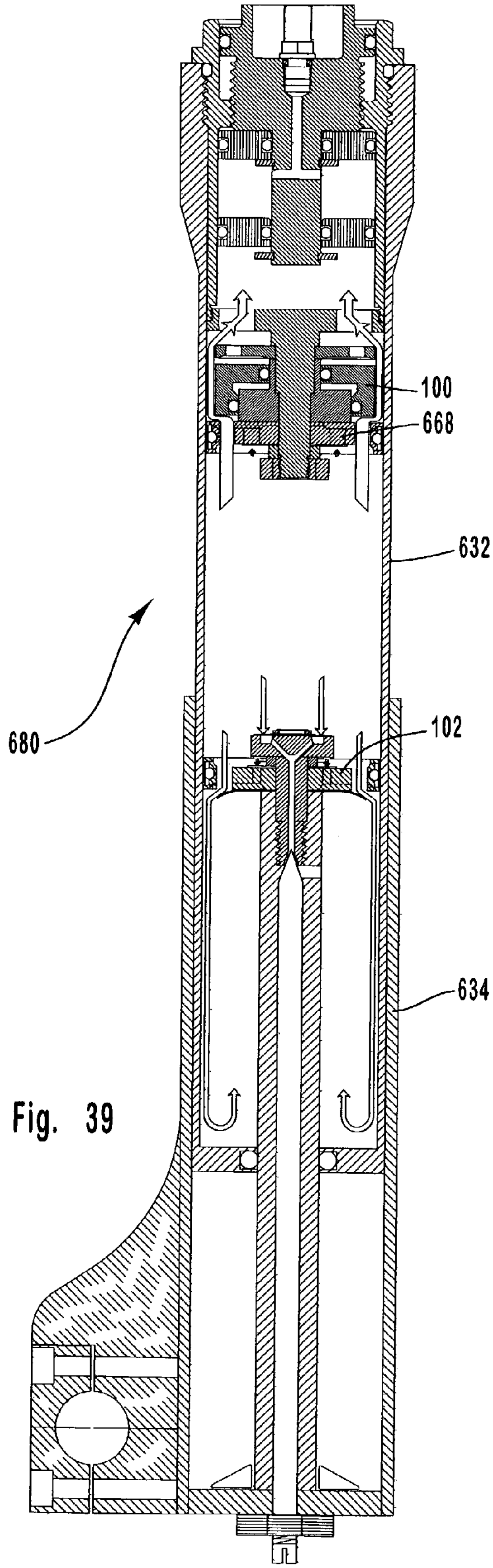
FIG. 39 is an elevated cross sectional side view of a front fork having a fixed base valve in the upper tube.
Figure 40:
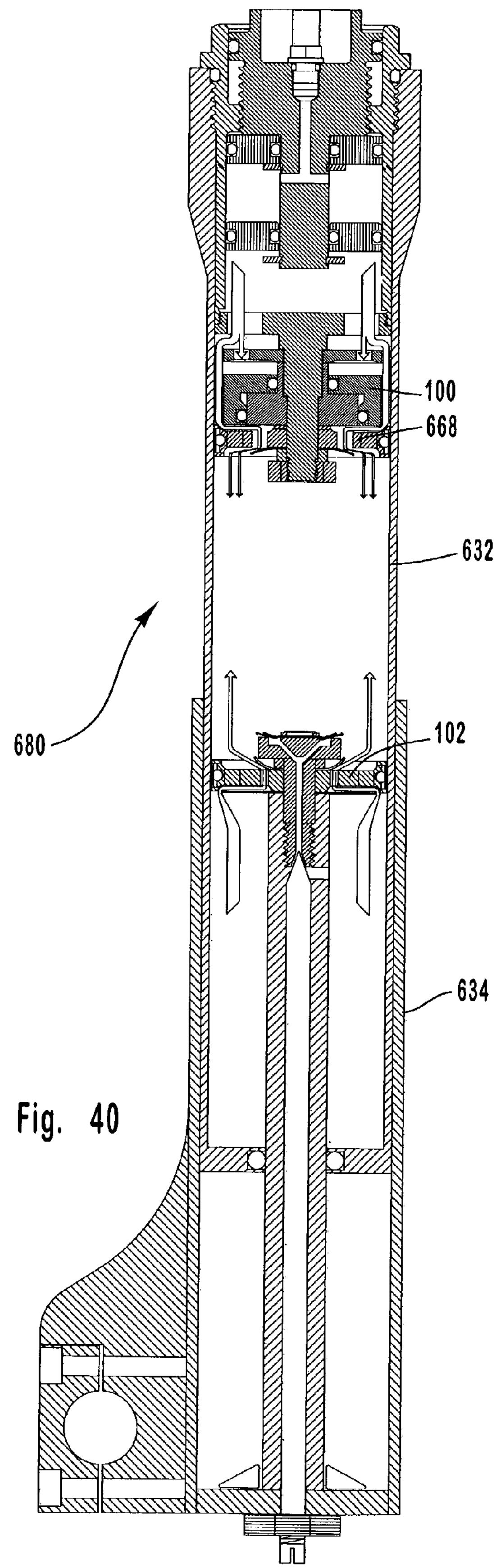
FIG. 40 is an elevated cross sectional side view of the front fork shown in FIG. 39 with the piston rod being retracted from the upper tube thereof.

It is appreciated that all of the different damping configurations disclosed herein can be incorporated in a front fork. As a further example, depicted in FIGS. 39 and 40 is a front fork 680 where control valve 100 has been moved from main piston 102 to base valve piston 668. This system operates similar to the damper discussed with regard to FIGS. 15–18.

The above discussed dampers of the present invention provide automatic adjustment of damping properties based on operating conditions, thereby optimizing damping. Different embodiments provide for a variety of selective manual damping adjustments and/or remote damping adjustments. Such adjustability enables the dampers to be effectively used in a variety of different conditions and on a variety of different vehicle or other systems. The design of the dampers also facilitates ease in manufacture and assembly.

The present invention may be embodied in other specific forms without departing from its spirit or essential characteristics. For example, disclosed herein are numerous examples of different dampers having different features for controlling damping properties. It is appreciated, however, that the different features can be mixed and matched so as to form a variety of other unique assemblies. Accordingly, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A suspension damper comprising:

a housing bounding a main chamber;

a main piston disposed within the main chamber of the housing, the main piston having a first side and an opposing second side with a compression port extending therebetween;

hydraulic fluid disposed within the main chamber;

a piston rod having a first end slideably disposed within the main chamber of the housing and an opposing second end disposed outside of the main chamber, the piston rod being selectively movable between an advanced position wherein a portion of the piston rod is advanced into the main chamber causing the fluid pressure of the hydraulic fluid to increase and a retracted position wherein the portion of the piston rod is retracted from the main chamber causing the fluid pressure of the hydraulic fluid to decrease, a portion of the hydraulic fluid passing through the compression port of the main piston as the piston rod is moved between the retracted position and the advanced position; and a control valve assembly disposed within the main chamber adjacent to the main piston, the control valve assembly comprising:

a valve guide; and a control valve with at least one of the valve guide or the control valve at least partially encircling the other so that a valve compartment is at least partially formed between the valve guide and the control valve, the valve compartment being sealed from the hydraulic fluid with a gas being disposed within the valve compartment, the control valve assembly being movable between a first position wherein the valve compartment is compressed to a first volume and the control valve is biased against the main piston so as to constrict the passage of the hydraulic fluid through the compression port and a second position wherein the valve compartment is expanded to a second volume larger than the first volume and the control valve is moved away from the main piston so that the hydraulic fluid can more freely flow through the compression port, wherein increasing the fluid pressure of the hydraulic fluid within the main chamber by moving the piston rod from the retracted position to the advanced position acts to move the control valve assembly toward the first position.

2. A suspension damper as recited in claim 1, wherein the main piston is mounted on the piston rod.

3. A suspension damper as recited in claim 1, wherein the valve guide is secured to or integrally formed with the main piston.

4. A suspension damper as recited in claim 1, further comprising:

a rebound port extending between the first side and the opposing second side of the main piston; and means for enabling fluid flow through the rebound port from the first side to the second side of the main piston while precluding fluid flow from the second side to the first side of the main piston.

5. A suspension damper as recited in claim 4, wherein the means for enabling fluid flow through the rebound port comprises a flexible shim mounted on the second side of the main piston so as to cover the rebound port thereat.

6. A suspension damper as recited in claim 1, further comprising a secondary piston disposed within the main chamber at a location spaced apart from the piston rod, the secondary piston having a first side and an opposing second side with a compression port extending therebetween.

7. A suspension damper as recited in claim 6, wherein the secondary piston is rigidly secured to the housing.

8. A suspension damper as recited in claim 1, wherein the main piston is mounted to the housing at a location spaced apart from the piston rod.

9. A suspension damper as recited in claim 6, further comprising:

a rebound port extending between the first side and the opposing second side of the secondary piston; and means for enabling fluid flow through the rebound port from the second side to the first side of secondary piston while precluding fluid flow from the first side to the second side of the secondary piston.

10. A suspension damper as recited in claim 1, further comprising a rebound channel extending through the piston rod between a first opening formed on the piston rod on one side of the main piston and a second opening formed on the piston rod on an opposing side of the main piston.

11. A suspension damper as recited in claim 10, further comprising a flow regulating pin movably disposed within a least a portion of the rebound channel.

12. A suspension damper as recited in claim 10, further comprising means for enabling fluid flow through the rebound channel from the first opening to the second opening while precluding fluid flow from the second opening to the first opening.

13. A suspension damper as recited in claim 1, wherein the piston rod comprises a rod body having a bolt coupled therewith, the bolt extending through the main piston.

14. A suspension damper as recited in claim 1, further comprising a stop plate mounted on the piston rod, the control valve assembly biasing against the stop plate when the control valve assembly is in the second position.

15. A suspension damper as recited in claim 14, wherein the stop plate has a first side and an opposing second side with an opening extending therebetween.

16. A suspension damper as recited in claim 1, further comprising a barrier disposed within the main chamber that divides the main chamber into a relative first chamber and a relative second chamber, the barrier preventing the transfer of fluids or gasses between the first chamber and the second chamber but enabling the transfer of a pressure differential between the first chamber and the second chamber, the main piston being disposed within the first chamber.

17. A suspension damper as recited in claim 16, wherein the barrier comprises a floating piston.

18. A suspension damper as recited in claim 16, wherein the barrier comprises an inflatable bladder disposed within the main chamber of the housing, the bladder bounding the second chamber.

19. A suspension damper as recited in claim 16, wherein the barrier comprises a flexible diaphragm mounted to the housing within the main chamber.

20. A suspension damper as recited in claim 16, wherein the housing comprises:

an inner sidewall bounding an inner chamber; and an outer sidewall encircling the inner side wall, an outer chamber being formed between the inner sidewall and outer sidewall in fluid communication with the inner chamber, the combined inner chamber and outer chamber comprising the main chamber.

21. A suspension damper as recited in claim 20, wherein the main piston and the control valve assembly are disposed within the inner chamber.

22. A suspension damper as recited in claim 20, wherein the barrier comprises an inflatable bladder disposed within the outer chamber of the housing.

23. A suspension damper as recited in claim 16, wherein the housing comprises:

a primary housing bounding a primary chamber;

a secondary housing spaced apart from the primary housing, the secondary housing bounding a secondary chamber, the combined primary chamber and secondary chamber comprising the main chamber; and a tubular stem fluid coupling the primary chamber to the secondary chamber.

24. A suspension damper as recited in claim 23, wherein the main piston and the control valve assembly are disposed within the primary chamber.

25. A suspension damper as recited in claim 23, wherein the main piston is disposed within the primary chamber and a secondary piston is disposed within the secondary chamber.

26. A suspension damper as recited in claim 23, wherein the barrier is disposed within the secondary chamber of the housing.

27. A suspension damper as recited in claim 23, further comprising a gas valve mounted on the secondary housing for selectively putting a gas into or withdrawing a gas from the secondary chamber.

28. A suspension damper as recited in claim 16, wherein the sealed valve compartment of the control valve contains a gas at a first pressure.

29. A suspension damper as recited in claim 28, wherein a hydraulic fluid is disposed within the first chamber and a compressible gas is disposed within the second chamber, the gas in the second chamber being at a second pressure that is greater than the first pressure in the valve compartment of the control valve.

30. A suspension damper as recited in claim 16, further comprising means for selectively adjusting the size of the second chamber.

31. A suspension damper as recited in claim 30, wherein the means for selectively adjusting the size of the second chamber comprises an adjusting piston bounding a portion of the second chamber, the adjusting piston being selectively movable into the second chamber so as to effectively decrease the size of the second chamber.

32. A suspension damper as recited in claim 16, further comprising means for selectively putting a gas into or withdrawing a gas from the second chamber.

33. A suspension damper as recited in claim 32, wherein the means for selectively putting a gas into or withdrawing a gas from the second compartment comprises a gas valve in fluid communication with the second chamber.

34. A suspension damper as recited in claim 16, further comprising a spring disposed within the second chamber and biasing against the barrier.

35. A shock absorber comprising the suspension damper as recited in claim 1.

36. A front fork comprising the suspension damper as recited in claim 1.

37. A suspension damper as recited in claim 1, wherein the housing comprises:

a primary housing bounding a primary chamber, the main piston being disposed within the primary chamber;

a secondary housing spaced apart from the primary housing, the secondary housing bounding a secondary chamber, the control valve assembly being at least partially disposed within the secondary chamber; and a tubular stem having a passage fluid coupling the primary chamber to the secondary chamber, the combined primary chamber, secondary chamber, and passage comprising the main chamber.

38. A suspension damper as recited in claim 37, wherein the control valve assembly is positioned so as to regulate the flow of fluid between the primary chamber and the secondary chamber.

39. A suspension damper as recited in claim 37, further comprising a floating piston disposed within the secondary chamber.

40. A suspension damper comprising:

a housing bounding a main chamber extending between a first end and an opposing second end;

a main piston disposed within the main chamber of the housing, the main piston having a first side and an opposing second side with a compression port extending therebetween;

a secondary piston disposed within the main chamber at a location between the main piston and the second end of the main chamber the secondary piston having a first side and an opposing second side with a compression port extending therebetween, the secondary piston being mounted to the housing;

hydraulic fluid disposed within the main chamber;

a piston rod having a first end slidably disposed within the main chamber of the housing and an opposing second end disposed outside the main chamber, the piston rod being selectively movable between an advanced position wherein a portion of the piston rod is advanced into the main chamber causing the fluid pressure of the hydraulic fluid to increase and a retracted position wherein the portion of the piston rod is retracted from the main chamber causing the fluid pressure of the hydraulic fluid to decrease, a portion of the hydraulic fluid passing through the compression port of the main piston and the secondary piston as the piston rod is moved between the retracted position and the advanced position; and a control valve assembly mounted on or adjacent to the main piston or the secondary piston, the control valve assembly comprising:

a valve guide;

a control valve with at least one of the valve guide or the control valve at least partially encircling the other; and at least one seal disposed between the valve guide and the control valve so that a valve compartment sealed from the hydraulic fluid is at least partially formed between the valve guide and the control valve with a gas being disposed within the valve compartment, the control valve assembly being moveable between a first position wherein a portion of the control valve is moved toward the main piston or the secondary piston so as to constrict the passage of the hydraulic fluid through the compression port and a second position wherein the portion of the control valve assembly is moved away from the main piston or the secondary piston so that the hydraulic fluid can more freely flow through the compression port, wherein increasing the fluid pressure of the hydraulic fluid within the main chamber by moving the piston rod from the retracted position to the advanced position acts to move the control valve assembly toward the first position.

41. A suspension damper as recited in claim 40, wherein the control valve assembly is disposed such that the control valve assembly substantially blocks the compression port on the main piston or the secondary piston when the control valve assembly is in the first position and the compression port is substantially unblocked when the control valve assembly is in the second position.

42. A suspension damper as recited in claim 40, further comprising:

a rebound port extending between the first side and the opposing second side of the secondary piston; and means for enabling fluid flow through the rebound port from the second side to the first side of secondary piston while precluding fluid flow from the first side to the second side of the secondary piston.

43. A suspension damper as recited in claim 40, wherein the secondary piston is rigidly secured to the housing.

44. A suspension damper as recited in claim 40, further comprising:

a rebound port extending between the first side and the opposing second side of the main piston; and means for enabling fluid flow through the rebound port from the first side to the second side of the main piston while precluding fluid flow from the second side to the first side of the main piston.

45. A suspension damper as recited in claim 40, further comprising a hydraulic fluid disposed at one end of the main chamber and a compressible gas disposed at the opposing end of the main chamber, the hydraulic fluid being in direct contact with the compressible gas.

46. A suspension damper as recited in claim 40, further comprising a barrier disposed within the main chamber that divides the main chamber into a relative first chamber and a relative second chamber, the barrier preventing the transfer of fluids or gasses between the first chamber and the second chamber but enabling the transfer of a pressure differential between the first chamber and the second chamber, being disposed within the first chamber.

47. A suspension damper as recited in claim 46, wherein the barrier comprises a floating piston.

48. A suspension damper as recited in claim 46, wherein the barrier comprises an inflatable bladder disposed within the main chamber of the housing, the bladder bounding the second chamber.

49. A suspension damper as recited in claim 46, wherein the barrier comprises a flexible diaphragm mounted to the housing within the main chamber.

50. A suspension damper as recited in claim 46, further comprising:

the sealed valve compartment of the control valve containing a gas at a first pressure;

a hydraulic fluid being disposed within the first chamber; and a compressible gas being disposed within the second chamber, the gas in the second chamber being at a second pressure that is greater than the first pressure in the valve compartment of the control valve.

51. A suspension damper as recited in claim 46, further comprising means for selectively adjusting the size of the second chamber.

52. A suspension damper as recited in claim 46, further comprising means for selectively putting a gas into or withdrawing a gas from the second chamber.

53. A suspension damper as recited in claim 46, further comprising a spring disposed within the second chamber and biasing against the barrier.

54. A suspension damper comprising:

a housing bounding a main chamber extending between a first end and an opposing second end;

a piston rod having a first end slideably disposed within the main chamber and an opposing second end disposed outside of the main chamber;

a main piston mounted on the first end of the piston rod within the main chamber of the housing so as to slideably engage against the housing in a substantially sealed engagement, the main piston having a first side and an opposing second side with a compression port extending therebetween;

hydraulic fluid disposed within the main chamber, a portion of the hydraulic fluid passing through the compression port as the piston rod is moved within the main chamber;

a control valve assembly disposed within the main chamber adjacent to the main piston, the control valve assembly comprising:

a valve guide;

a control valve; and at least one seal disposed between the valve guide and the control valve so that a valve compartment sealed from the hydraulic fluid is at least partially formed between the valve guide and the control valve with a gas being disposed within the valve compartment, the control valve assembly being moveable between a first position wherein a portion of the control valve is moved toward the main piston so as to constrict the passage of the hydraulic fluid through the compression port and a second position wherein the portion of the control valve assembly is moved away from the main piston so that the hydraulic fluid can more freely flow through the compression port; and a rebound channel extending through the piston rod between a first opening formed on the piston rod on one side of the main piston and a second opening formed on the piston rod on the opposing side of the main piston, the first opening and the second opening each communicating with the main chamber.

55. A suspension damper as recited in claim 51, further comprising:

a rebound port extending between the first side and the opposing second side of the main piston; and means for enabling fluid flow through the rebound port from the first side to the second side of the main piston while precluding fluid flow from the second side to the first side of the main piston.

56. A suspension damper as recited in claim 51, further comprising a barrier disposed within the main chamber that divides the main chamber into a relative first chamber and a relative second chamber, the barrier preventing the transfer of fluids or gasses between the first chamber and the second chamber but enabling the transfer of a pressure differential between the first chamber and the second chamber, the main piston being disposed within the first chamber.

57. A suspension damper as recited in claim 56, wherein the barrier comprises a floating piston.

58. A suspension damper as recited in claim 56, further comprising:

the sealed valve compartment of the control valve containing a gas at a first pressure;

a hydraulic fluid being disposed within the first chamber; and a compressible gas being disposed within the second chamber, the gas in the second chamber being at a second pressure that is greater than the first pressure in the valve compartment of the control valve.

59. A suspension damper as recited in claim 51, further comprising a flow regulating pin movably disposed within a least a portion of rebound channel.

60. A suspension damper as recited in claim 51, further comprising means for enabling fluid flow through the rebound channel from the first opening to the second opening while precluding fluid flow from the second opening to the first opening.

61. A suspension damper as recited in claim 54, further comprising a secondary piston disposed within the main chamber at a location between the piston rod and the second end of the main chamber, the secondary piston having a first side and an opposing second side with a compression port extending therebetween.

62. A suspension damper as recited in claim 54, wherein increasing the fluid pressure of the hydraulic fluid within the main chamber acts to move the control valve assembly toward the first position.

63. A suspension damper comprising:

a housing bounding a main chamber;

a barrier disposed within the main chamber that divides the main chamber into a relative first chamber and a relative second chamber, the barrier preventing the transfer of fluids or gasses between the first chamber and the second chamber but enabling the transfer of a pressure differential between the first chamber and the second chamber;

a main piston disposed within the first chamber of the housing, the main piston having a first side and an opposing second side with a compression port extending therebetween;

a hydraulic fluid disposed within the first chamber, the hydraulic fluid having a fluid pressure;

a piston rod having a first end slideably disposed within the first chamber of the housing and an opposing second end disposed outside of the first chamber, the piston rod being selectively movable between an advanced position wherein a portion of the piston rod is advanced into the main chamber causing the fluid pressure of the hydraulic fluid to increase and a retraced position wherein the portion of the piston rod is retracted from the main chamber causing the fluid pressure of the hydraulic fluid to decrease, a portion of the hydraulic fluid passing through the compression port of the main piston as the piston rod is moved between the retracted position and the advanced position; and a control valve assembly disposed within the first chamber, the control valve assembly comprising:

a valve guide;

a control valve; and a valve compartment at least partially formed between the valve guide and the control valve, the valve compartment being sealed from the hydraulic fluid with a gas being disposed within the valve compartment, the control valve assembly being movable between a first position wherein a portion of the control valve is moved toward the main piston so as to constrict the passage of the hydraulic fluid through the compression port and a second position wherein the portion of the control valve assembly is moved away from the main piston so that the hydraulic fluid can more freely flow through the compression port, wherein increasing the fluid pressure of the hydraulic fluid within the main chamber by moving the piston rod from the retracted position to the advanced position acts to move the control valve assembly toward the first position.

64. A suspension damper as recited in claim 61, wherein the housing comprises:

a primary housing bounding a primary chamber;

a secondary housing spaced apart from the primary housing, the secondary housing bounding a secondary chamber; and a tubular stem having a passage fluid coupling the primary chamber to the secondary chamber, the combined primary chamber, secondary chamber, and passage comprising the main chamber.

65. A suspension damper as recited in claim 64, wherein the main piston is disposed within the primary chamber and the control valve assembly is at least partially disposed within the secondary chamber.

66. A suspension damper as recited in claim 65, further comprising a floating piston disposed within the secondary chamber.

67. A suspension damper as recited in claim 66, further comprising a gas valve mounted on the secondary housing for selectively putting a gas into or withdrawing a gas from the secondary chamber.

68. A suspension damper as recited in claim 64, wherein the main piston is disposed within the primary chamber and a secondary piston is disposed within the secondary chamber.

69. A suspension damper as recited in claim 63, wherein at least one of the control valve and valve guide encircles the other.

70. A suspension damper as recited in claim 63, wherein the main piston is mounted on the piston rod.

71. A suspension damper as recited in claim 63, wherein the valve compartment is sealed closed within the first chamber so that the valve compartment does not communicate outside of the housing.

* * * * *

UNITED STATES PATENT AND TRADEMARK OFFICE

CERTIFICATE OF CORRECTION

PATENT NO. : 6,978,872 B2
APPLICATION NO. : 10/449722
DATED : December 27, 2005

INVENTOR(S) : Roy A. Turner

It is certified that error appears in the above-identified patent and that said Letters Patent is hereby corrected as shown below:

<u>Column 4</u>
Line 60, after "seal has" remove [bee]

<u>Column 5</u>
Line 16, after "invention" insert --,--

<u>Column 6</u>
Line 5, change "0.3" to --0.1--
Line 6, change "0.3" to --0.2--

<u>Column 7</u>
Line 60, change "60%" to --70%--
Line 60, change "70%" to --80%--

<u>Column 9</u>
Line 58, change "then" to --than--

<u>Column 12</u>
Line 39, change "obtain" to --obtained--

<u>Column 17</u>
Line 30, change "use" to --used--
Line 62, after "valve chamber" insert --452--

UNITED STATES PATENT AND TRADEMARK OFFICE

CERTIFICATE OF CORRECTION

PATENT NO. : 6,978,872 B2
APPLICATION NO. : 10/449722
DATED : December 27, 2005
INVENTOR(S) : Roy A. Turner It is certified that error appears in the above-identified patent and that said Letters Patent is hereby corrected as shown below:

Column 21
Line 33, change "vehicle" to --vehicles--

Column 27
Line 13, change "claim 51" to --claim 54--
Line 21, change "claim 51" to --claim 54--

Column 28
Line 40, change "claim 61" to --claim 63--

Signed and Sealed this

Twenty-fifth Day of July, 2006

JON W. DUDAS
*Director of the United States Patent and Trademark Office*

UNITED STATES PATENT AND TRADEMARK OFFICE

CERTIFICATE OF CORRECTION

PATENT NO. : 6,978,872 B2
APPLICATION NO. : 10/449722
DATED : December 27, 2005

INVENTOR(S) : Roy A. Turner

It is certified that error appears in the above-identified patent and that said Letters Patent is hereby corrected as shown below:

Column 4
Line 60, after "seal has" remove [been]

Column 5
Line 16, after "invention" insert --,--

Column 6
Line 5, change "0.3" to --0.1--
Line 6, change "0.3" to --0.2--

Column 7
Line 60, change "60%" to --70%--
Line 60, change "70%" to --80%--

Column 9
Line 58, change "then" to --than--

Column 12
Line 39, change "obtain" to --obtained--

Column 17
Line 30, change "use" to --used--
Line 62, after "valve chamber" insert --452--

UNITED STATES PATENT AND TRADEMARK OFFICE

CERTIFICATE OF CORRECTION

PATENT NO. : 6,978,872 B2 
APPLICATION NO. : 10/449722
DATED : December 27, 2005
INVENTOR(S) : Roy A. Turner It is certified that error appears in the above-identified patent and that said Letters Patent is hereby corrected as shown below:

Column 21
Line 33, change "vehicle" to --vehicles--

Column 27
Line 13, change "claim 51" to --claim 54--
Line 21, change "claim 51" to --claim 54--

Column 28
Line 40, change "claim 61" to --claim 63--

This certificate supersedes Certificate of Correction issued July 25, 2006.

Signed and Sealed this

Ninth Day of January, 2007

JON W. DUDAS
*Director of the United States Patent and Trademark Office*